US011795675B2

(12) United States Patent
Chen et al.

(10) Patent No.: US 11,795,675 B2
(45) Date of Patent: Oct. 24, 2023

(54) SMART SANITARY SYSTEM AND CONTROL METHOD THEREOF

(71) Applicants: Kai-Yi Chen, Taipei (TW); Chia-Shin Weng, Taipei (TW); Li-Chuan Wang, Taipei (TW); Chiao-Tsu Chiang, Taipei (TW); Sheng-Chieh Tang, Taipei (TW)

(72) Inventors: Kai-Yi Chen, Taipei (TW); Chia-Shin Weng, Taipei (TW); Li-Chuan Wang, Taipei (TW); Chiao-Tsu Chiang, Taipei (TW); Sheng-Chieh Tang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 99 days.

(21) Appl. No.: 16/553,135

(22) Filed: Aug. 27, 2019

(65) Prior Publication Data
US 2020/0087908 A1 Mar. 19, 2020

Related U.S. Application Data

(60) Provisional application No. 62/733,582, filed on Sep. 19, 2018.

(51) Int. Cl.
*E03D 9/00* (2006.01)
*E04B 2/82* (2006.01)
(Continued)

(52) U.S. Cl.
CPC .......... *E03D 9/007* (2013.01); *A47K 4/00* (2013.01); *E04B 1/34869* (2013.01); *E04B 2/827* (2013.01); *H04R 1/025* (2013.01)

(58) Field of Classification Search
CPC .......... A47K 13/10; A47K 13/245; A47K 2003/365–367; A47K 3/281; A47K 3/30;
(Continued)

(56) References Cited

U.S. PATENT DOCUMENTS 6,604,709 B1 8/2003 Wentland et al.
6,756,998 B1 * 6/2004 Bilger ................ H04L 12/2803
715/734
(Continued)

FOREIGN PATENT DOCUMENTS

CN 201011142 * 1/2008 .............. A47K 4/00
CN 205012688 2/2016
(Continued)

OTHER PUBLICATIONS

"Office Action of Taiwan Counterpart Application", dated May 7, 2020, p. 1-p. 9.
(Continued)

*Primary Examiner* — David P Angwin
*Assistant Examiner* — Nicholas A Ros
(74) *Attorney, Agent, or Firm* — JCIPRNET

(57) ABSTRACT

A smart sanitary system and a control method thereof are provided. A fixed display, a movable display, a shower unit and a toilet unit are provided. Motion of the movable display is controlled relative to the fixed display. The operation of the shower unit or the toilet unit is controlled according to the position of the movable display. Accordingly, a diversified space is provided, and the operation of sanitary equipment is triggered with the variation of the space.

13 Claims, 21 Drawing Sheets

(51) Int. Cl.
*H04R 1/02* (2006.01)
*E04B 1/348* (2006.01)
*A47K 4/00* (2006.01)

(58) Field of Classification Search
CPC ...... A47K 3/34; A47K 3/36–362; A47K 4/00; E03C 1/01; E03C 1/055; E03C 1/057; E04B 1/34869; E05F 15/43; E06B 7/30; H04L 12/2803; H04L 12/282; H04L 2012/285
USPC ...................................................... 52/34–35
See application file for complete search history.

(56) References Cited

U.S. PATENT DOCUMENTS

| | | | | |
|---|---|---|---|---|
| 6,992,570 | B2* | 1/2006 | Weinstein Ide | A47K 17/00 340/384.1 |
| 8,780,201 | B1* | 7/2014 | Scalisi | H04N 7/186 348/143 |
| 9,702,483 | B2* | 7/2017 | Carver | E03C 1/324 |
| 9,949,597 | B2* | 4/2018 | Tsibulevskiy | F21V 33/004 |
| 9,959,082 | B2* | 5/2018 | Dominique | G06F 3/1423 |
| 10,626,583 | B2* | 4/2020 | Mazz | E03C 1/0408 |
| 2017/0068228 | A1* | 3/2017 | Schoenbeck | E03D 5/105 |
| 2017/0108235 | A1* | 4/2017 | Guan | F24F 11/30 |
| 2017/0215655 | A1* | 8/2017 | Ophardt | G06F 3/167 |
| 2017/0321469 | A1* | 11/2017 | Jones | E06B 3/01 |
| 2018/0129885 | A1* | 5/2018 | Potter | G08B 3/10 |
| 2019/0089550 | A1* | 3/2019 | Rexach | E03D 9/002 |
| 2019/0373152 | A1* | 12/2019 | Tan | G03B 9/08 |
| 2020/0407954 | A1* | 12/2020 | Grimaldi | E03D 1/003 |

FOREIGN PATENT DOCUMENTS

| | | | | |
|---|---|---|---|---|
| CN | 105672839 | * | 6/2016 | ............ Y02B 20/40 |
| CN | 205548416 | | 9/2016 | |
| CN | 205722624 | | 11/2016 | |
| CN | 106193892 | * | 12/2016 | ............ G08B 21/24 |
| CN | 108091123 | | 5/2018 | |
| TW | I239826 | | 9/2005 | |
| TW | 201446006 | | 12/2014 | |

OTHER PUBLICATIONS

"Office Action of China Counterpart Application", dated Mar. 23, 2021, p. 1-p. 16.

* cited by examiner

SMART SANITARY SYSTEM AND CONTROL METHOD THEREOF

CROSS REFERENCE TO RELATED APPLICATION

This application claims the priority benefit of U.S. provisional application Ser. No. 62/733,582, filed on Sep. 19, 2018. The entirety of the above-mentioned patent application is hereby incorporated by reference herein and made a part of specification.

BACKGROUND OF THE DISCLOSURE

1. Field of the Disclosure

The present disclosure generally relates to a light source module and a display panel, in particular, to a backlight module and a liquid crystal display panel.

The present disclosure relates to sanitary equipment, in particular, to a multifunctional and automatically operated smart sanitary system and a control method thereof.

2. Description of Related Art

Modern people have gotten used to using sanitary equipment such as a toilet, a urinal, and a wash basin, and water is supplied through the sanitary equipment, so as to wash away excrement or wash an object. However, most pieces of sanitary equipment have a slight appearance difference between each other, and have functions that are almost the same, and even occupy partial spaces. Moreover, the housing price upsurges at current, each residence has a limited space, and lavatory or bathroom spaces in most residences are roughly fixed and are lacking in elasticity. Accordingly, it is necessary to propose an innovative function and a breakthrough change for existing sanitary equipment and a space thereof.

SUMMARY OF THE DISCLOSURE

Accordingly, the present disclosure is directed to a smart sanitary system and a control method thereof. A movable display is disposed, and different spaces are formed by changing a position of the display, thereby being applied to different use situations, and being further combined with automated sanitary equipment.

A smart sanitary system according to an embodiment of the present disclosure includes but is not merely limited to a toilet unit, a shower unit, a fixed display, a movable display, a motor and a user instruction sensor. The shower unit is disposed beside the toilet unit. The fixed display is fixedly disposed on a side of the shower unit. The movable display is relatively movably disposed on a side of the fixed display. The motor drives motion of the movable display. The user instruction sensor is configured to detect a user instruction, and control at least one of the toilet unit, the shower unit or the movable display based on the user instruction.

A smart sanitary system according to an embodiment of the present disclosure includes but is not merely limited to a toilet unit, a shower unit, a movable display, a motor and a user instruction sensor. The shower unit is disposed beside the toilet unit. The movable display is disposed beside the shower unit. The motor drives motion of the movable display. The user instruction sensor is configured to detect a user instruction, and control at least one of the toilet unit, the shower unit or the movable display based on the user instruction.

According to another aspect, a control method of a smart sanitary system according to an embodiment of the present disclosure includes the following steps: providing a fixed display, a movable display, a shower unit and a toilet unit; controlling motion of the movable display relative to the fixed display; and controlling an operation of the shower unit or the toilet unit according to a position of the movable display.

A control method of a smart sanitary system according to an embodiment of the present disclosure includes the following steps: providing a movable display, a shower unit and a toilet unit; controlling motion of the movable display; and controlling an operation of the shower unit or the toilet unit according to a position of the movable display.

Based on the foregoing, in the smart sanitary system and the control method thereof according to the embodiments of the present disclosure, the movable display is driven through wireless remote control, an action operation or a voice instruction, so as to define different space forms through the movable display and the fixed display. According to different user instructions, when the position of the movable display is changed, the cover of the toilet unit may be opened or closed, or the shower unit may supply water or stop supplying water. Moreover, a displayed image or video on the fixed or movable display may conform to an operation of the toilet unit, the shower unit or another auxiliary apparatus. Accordingly, a bathroom area may be integrated together with a living room area/motion area to extend the space, and the bathroom area may be further isolated as required.

In order to make the aforementioned and other objectives and advantages of the present disclosure comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
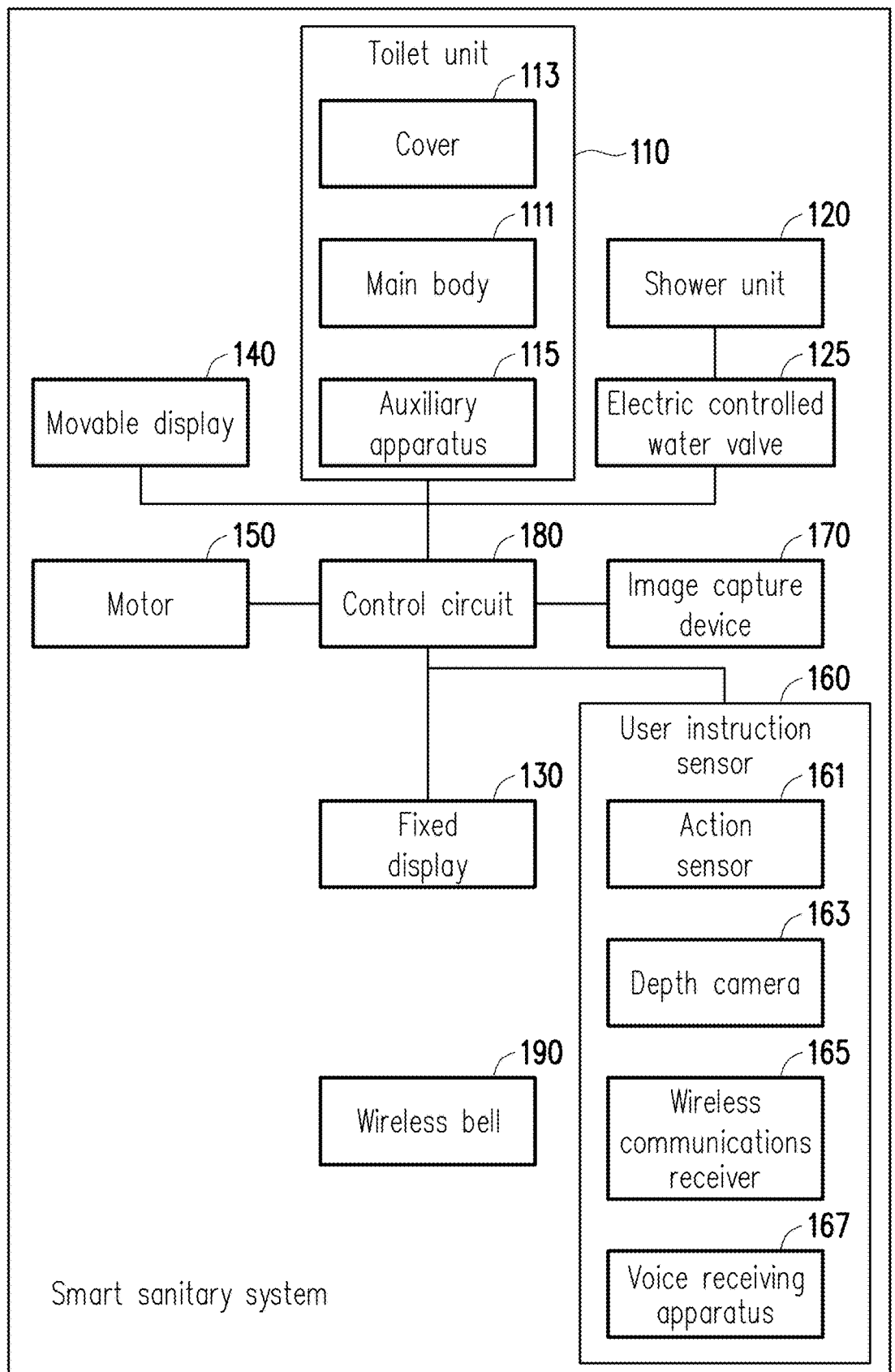
FIG. 1 is a component block diagram of a smart sanitary system according to an embodiment of the present disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a component block diagram of a smart sanitary system 100 according to an embodiment of the present disclosure. Referring to FIG. 1, the smart sanitary system 100 includes but is not merely limited to a toilet unit 110, a shower unit 120, an electrically controlled water valve 125, a fixed display 130, one or more movable displays 140, at least one motor 150, a user instruction sensor 160, an image capture device 170, a control circuit 180 and a wireless bell 190.

The toilet unit 110 includes but is not merely limited to a body 111, a cover 113 and an auxiliary apparatus 115. The body 111 may be a toilet base, and has an opening, and the shape and the size thereof may be adjusted according to an actual requirement. The cover 113 may be a toilet cover, a cushion or a combination thereof, and is movably disposed at the body 111 (for example, through a component such as a slide rail or a pivoting base). In this embodiment, the cover 113 is configured to cover an opening of the body 111, and motion (for example, rotation, movement, or going up and down) of the cover 113 may be driven through the motor 150, thereby selectively closing or opening the opening of the body 111. The auxiliary apparatus 115 is disposed at the body 111, and may be a flavor releaser, a loudspeaker (or referred to as a horn), a display device (for example, an LCD or an LED screen), another apparatus for providing a sensory experience such as a visual sense, an auditory sense, or a smell sense, or a combination thereof.

Figure 2A:
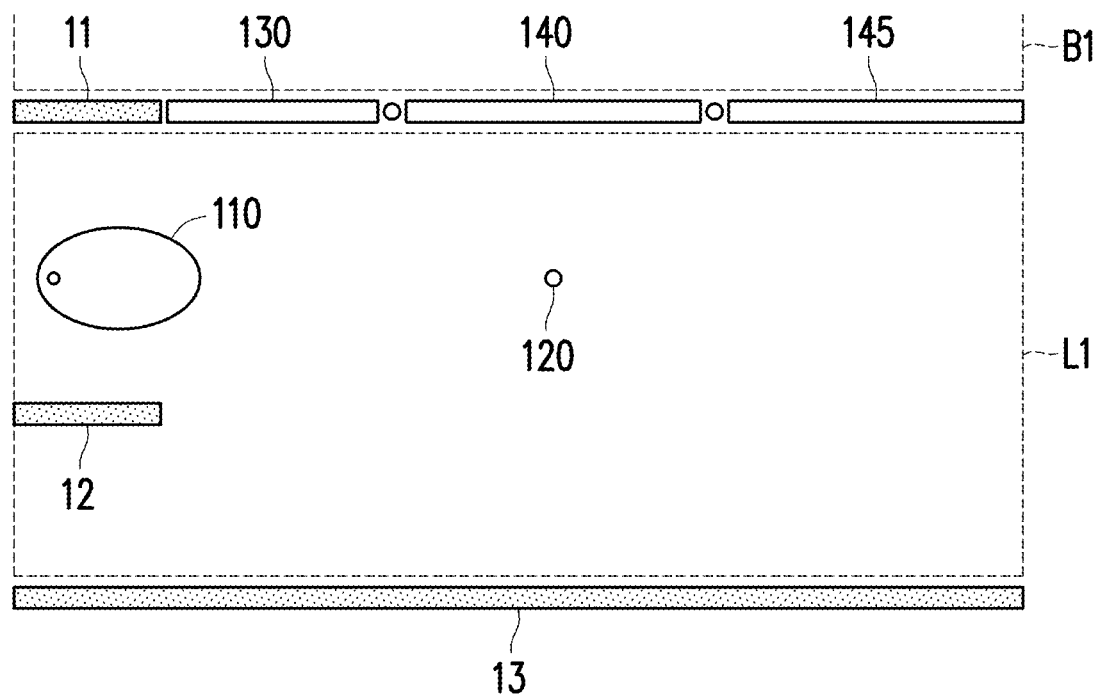
FIG. 2A is a space configuration diagram of a compartment structure according to a first embodiment of the present disclosure.
Figure 2B:
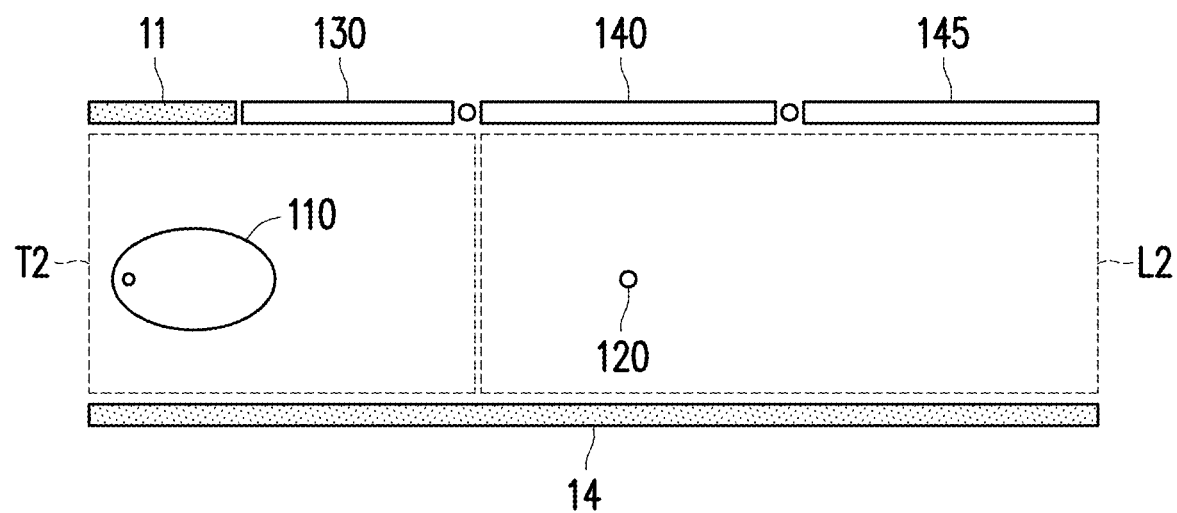
FIG. 2B is a space configuration diagram of a compartment structure according to a second embodiment of the present disclosure.

FIG. 2A is a space configuration diagram of a compartment structure according to a first embodiment of the present disclosure. Referring to FIG. 2A, a side of a toilet unit 110 is provided with an external wall 11, and another side of the toilet unit 110 is provided with a movable or fixed screen 12. Moreover, FIG. 2B is a space configuration diagram of a compartment structure according to a second embodiment of the present disclosure. A space configuration can further have another variation. Referring to FIG. 2B, two sides of a toilet unit 110 may be provided with external walls 11 and 14, and the external wall 14 extends from the toilet unit 110 to a movable display 140 and/or a second movable display 145 (that is, another movable display 140).

Figure 3:
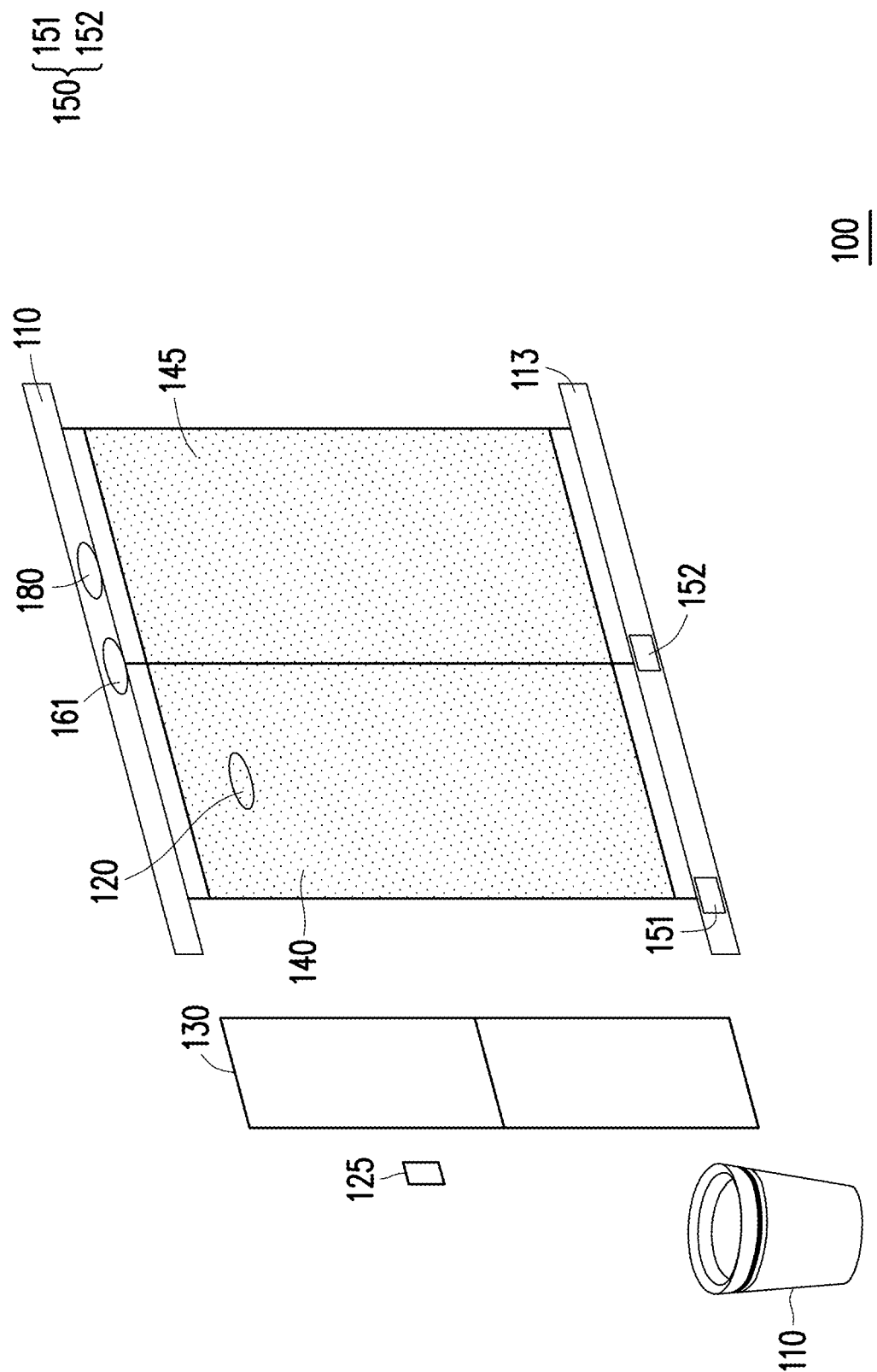
FIG. 3 is a schematic diagram of a smart sanitary system according to an embodiment of the present disclosure.

A shower unit 120 may include but is not merely limited to components such as a shower head, a water tube, and a water tap. FIG. 3 is a schematic diagram of a smart sanitary system 100 according to an embodiment of the present disclosure. Referring to FIG. 2A and FIG. 3 together, the shower head (that is, a water outlet) of the shower unit 120 is disposed beside the toilet unit 110, and there is a particular spacing (for example, 60, 80, or 100 centimeters) between the two.

The electrically controlled water valve 125 is coupled to the shower unit 120, and is configured to control the shower unit 120 to supply water or stop supplying water, control a water yield and a water temperature thereof and detect the water temperature. For example, the electrically controlled water valve 125 detects a current water temperature, and mixes, in response to that the water temperature does not conform to a predetermined temperature, water of the two temperatures, so as to provide the mixed water through the shower head of the shower unit 120, thereby reaching the predetermined temperature, and then achieving a constant temperature effect.

The fixed display 130 and the movable display 140 may be display panels such as waterproof display panels, liquid crystal display panels, organic light emitting diode (OLED) display panels, or electrophoretic display panels, and are configured to present an image or a video.

In this embodiment of the present disclosure, referring to FIG. 2A, FIG. 2B and FIG. 3, the fixed display 130 is fixedly disposed on a side of the shower unit 120; the movable display 140 is relatively movably disposed (for example, pivotally disposed or slidably disposed) on a side of the fixed display 130 (the side is a right side shown in the figures, but is not limited to this direction); the second movable display 145 is relatively movably disposed (for example, pivotally disposed or slidably disposed) on a side of the movable display 140 (the side is a right side shown in the figures, but is not limited to this direction). The movable display 140 and the second movable display 145 may be movably disposed at or pivotally disposed at the fixed display 130 and the movable display 140 respectively through a hinged, foldable, slidable, or rotatable structure (for example, a component such as a slide rail, a pivoting base, or a hinge).

Referring to FIG. 2A, FIG. 2B and FIG. 3, the fixed display 130, the movable display 140, and the second movable display 145 may be coplanar turned off with each other. It should be noted that, another side of the screen 12 in FIG. 2A relative to the external wall 11 is further provided with another external wall 13, and the external wall 14 extends from the toilet unit 110 to the movable display 140 and/or the second movable display 145, so that the external walls 11 and 13, the fixed display 130, the movable display 140, and the second movable display 145 define a living room area L1 or a motion area (which is integrated together with a bathroom area). With respect to space planning, the displays 130, 140, and 145 coplanar turned off with each other may be used as an extension wall surface of the external wall 11, thereby obtaining two spaces (for example, the living room area L1 and a bedroom area B1) through separation.

According to another aspect, different from the space configuration shown in FIG. 2A in that, the external wall 14, the movable display 140, and the second movable display 145 in FIG. 2B define a living room area L2 or a motion area, and the external walls 11 and 14, and the fixed display 130 define a bathroom area T2.

It should be noted that, the space configurations shown in FIG. 2A and FIG. 2B are used as only an example reference, may be autonomously adjusted by a user according to an actual requirement, and are not limited in this embodiment of the present disclosure. Moreover, in some embodiments, the smart sanitary system 100 may include only one movable display 140 or more than three movable displays 140, and the smart sanitary system 100 may alternatively be not provided with the fixed display 130 (the movable display 140 may be disposed beside the shower unit 120).

The motor 150 may be various motors such as a servo motor, a linear motor, and a step motor, and one or more motors 150 are connected to the movable display 140, the second movable display 145 and the cover 113 of the toilet unit 110. In this embodiment, the motors 150 are configured to drive motion (for example, rotation or sliding) of the movable display 140, the second movable display 145 and the cover 113 respectively. For example, referring to FIG. 3, motors 151 and 152 respectively control rotation of the movable display 140 and the second movable display 145.

The user instruction sensor 160 includes but is not merely limited to an action sensor 161, a depth camera 163, a wireless communications receiver 165, and a voice receiving apparatus 167.

The action sensor 161 may be a barred action sensor (for example, an infrared (IR) sensor or an ultrasonic sensor), an image sensor, or another sensor that may generate a sensing value/sensing data in response to a relative position, motion or a posture of an external object. In this embodiment, the action sensor 161 is configured to detect a gesture, or another posture or action of the user.

The depth camera 163 is configured to capture a depth image of the external object, and the obtained depth image may be used to determine a position of the external object in the depth image, thereby determining a distance relative to the object. In this embodiment of the present disclosure, the depth camera 163 is configured to detect a user position. For example, the user position is in front of the movable display 140 or the fixed display 130.

The wireless communications receiver 165 may be a receiver supporting a wireless communications technology such as Bluetooth, infrared, ZigBee, or Wi-Fi. In this embodiment, the wireless communications receiver 165 receives a wireless command signal sent by a smart phone, a tablet computer, a remote control, or the wireless bell 190 of the user.

The voice receiving apparatus 167 may be a sound recording apparatus such as a microphone or a sound recorder. In this embodiment of the present disclosure, the voice receiving apparatus 167 is configured to receive a voice instruction of the user.

The image capture device 170 may be an apparatus such as a camera, a video camera, or a scanner, and is configured to photograph the external object (for example, the user or an animal), so as to obtain an object image corresponding to the external object.

The control circuit 180 may be a processing unit such as a CPU, a microcontroller, a chip, an application-specific integrated circuit (ASIC), or a field programmable gate array (FPGA), and the control circuit 180 is coupled to the toilet unit 110, the electrically controlled water valve 125, the fixed display 130, the movable display 140, the motor 150, and the image capture device 170, thereby controlling starting, turn-off or other functions (for example, rotation, starting time, water supply, water detection, screen display, image capture, and image processing) of these apparatuses.

The wireless bell 190 includes but is not merely limited to a button, a wireless communications transmitter (which uses a communications technology same as or compatible with that used by the wireless communications receiver 165), and an image capture device (which is configured to photograph the external object). In this embodiment of the present disclosure, in response to that the button is pressed, an image captured by the image capture device may be transferred to the wireless communications receiver 165 through a guest signal.

The movable display 140 and the second movable display 145 of the smart sanitary system 100 according to this embodiment of the present disclosure may be driven by the motor 150, to be automatically turned on or turned off. Appropriate control over these apparatuses or mechanism components helps create a plurality of space forms and can adapt to a plurality of situations. Moreover, motion of the movable display 140 or the second movable display 145 may trigger an operation of another apparatus, thereby simplifying user operations.

Figure 4:
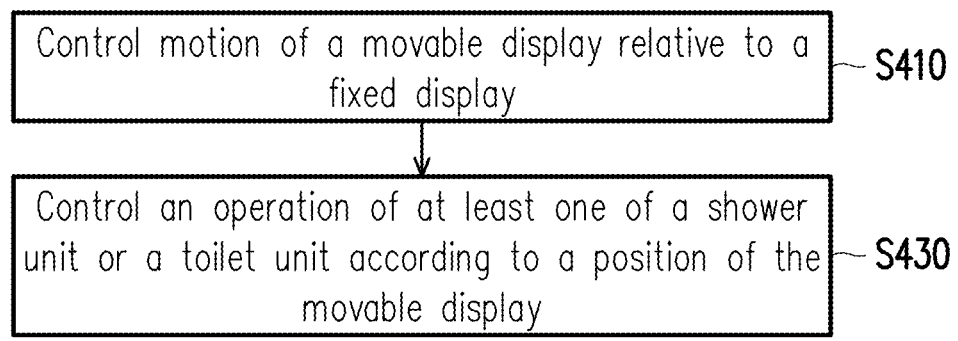
FIG. 4 is a flowchart of a control method of a smart sanitary system according to an embodiment of the present disclosure.

To help understand an operation process of this embodiment, description is made below with reference to apparatuses and mechanism components of the smart sanitary system 100 in FIG. 1. FIG. 4 is a flowchart of a control method of a smart sanitary system 100 according to an embodiment of the present disclosure. Referring to FIG. 4, for an actually changed space communication relationship, a control circuit 180 controls a motor 150 to control motion of a movable display 140 relative to a fixed display 130 (or another fixed object) (step S410), or to control motion of a second movable display 145 (that is, another movable display 140) relative to the movable display 140. Specifically, according to different motion manners (for example, rotation, sliding, and folding) of the movable display 140 and the second movable display 145, the control circuit 180 may control the motor 150 connected to the movable display 140 and the second movable display 145, and accordingly control one or both of the movable display 140 and the second movable display 145 to be turned on or turned off. For example, the movable display 140 is rotated clockwise by 90 degrees, and the second movable display 145 is rotated counter-clockwise by 90 degrees; the movable display 140 is far away relative to the second movable display 145. However, when the movable display 140 and/or the second movable display 145 is turned on in parallel, the external object may actually pass through a passage formed by the movable display 140 and/or the second movable display 145; or when the movable display 140 is coplanar turned off with the second movable display 145, the external object cannot pass through the movable display 140 and the second movable display 145.

In this embodiment of the present disclosure, a user instruction is detected through the user instruction sensor 160. According to different types of sensors, this user instruction may be a gesture command signal, a wireless command signal or a voice instruction. The control circuit 180 may parse the user instruction, and obtain a control object (for example, the movable display 140, the second movable display 145, the toilet unit 110 or the shower unit 120) designated by the user instruction. Then, the control circuit 180 may control the motor 150 according to this user instruction to drive rotation or sliding of the movable display 140 and/or the second movable display 145, or drive functions of the toilet unit 110 and/or the shower unit 120.

Moreover, the control circuit 180 may present an image or a video on the fixed display 130, the movable display 140, and the second movable display 145. In addition to providing corresponding information (for example, news, a movie, weather, or a water temperature) to the toilet unit 110, the shower unit 120 or a user requirement, scenarios such as waterfall, grassland, and city can also be provided in adaptation to different situations, thereby changing a feeling of the visual sense for space variation.

For ease of understanding the spirit of the embodiments of the present disclosure, application situations under different space adjustment are described below in detail by listing a plurality of embodiments.

Figure 5:
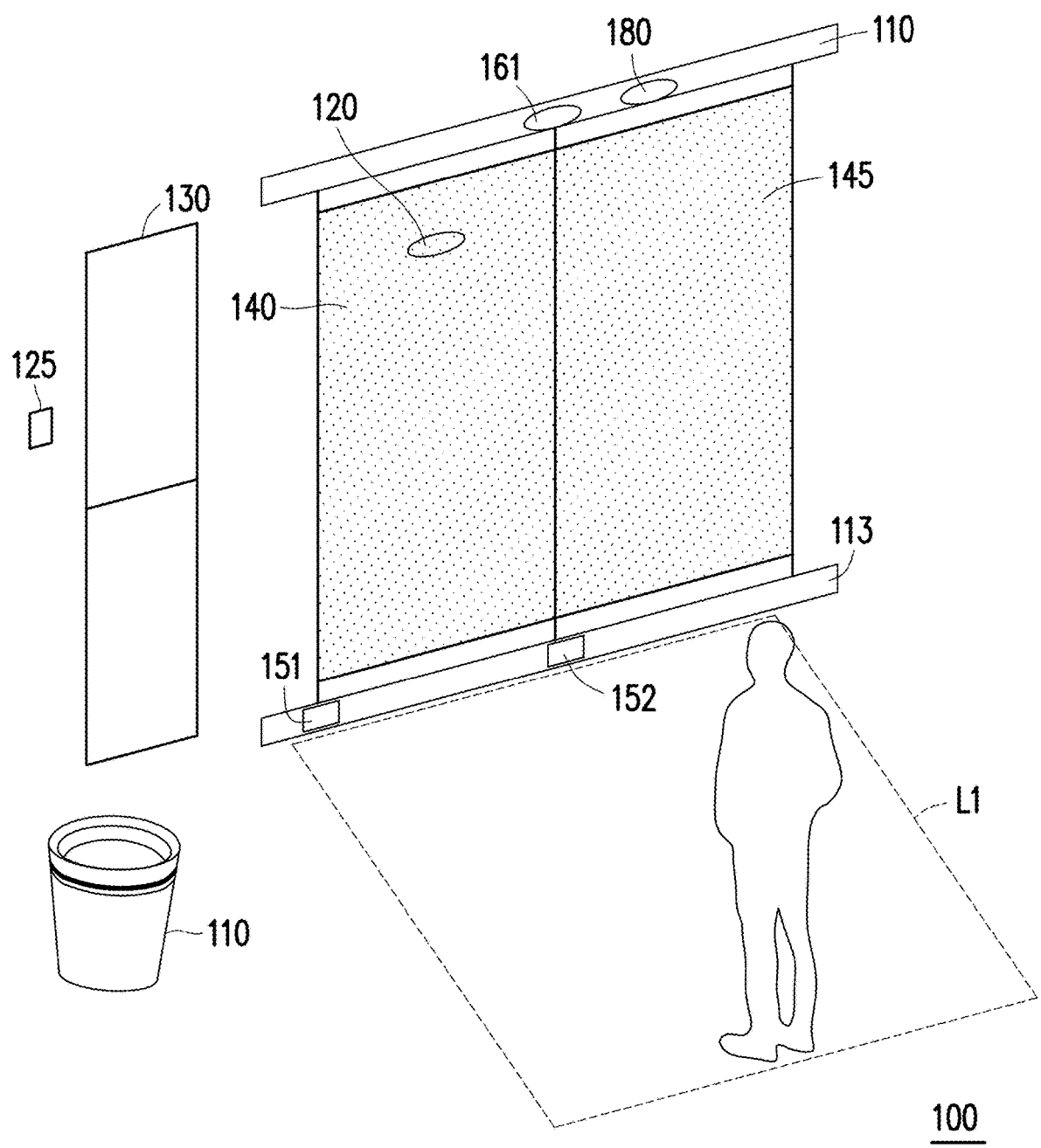
FIG. 5 is a schematic diagram of a smart sanitary system used for motion in a living room according to an embodiment of the present disclosure.

FIG. 5 is a schematic diagram of a smart sanitary system 100 used for motion in a living room according to an embodiment of the present disclosure. Referring to FIG. 2A and FIG. 5, when the movable display 140 is coplanar turned off with the second movable display 145, a living room area L1 having a relatively large space may be formed. A user may watch a jointly spliced screen or segmented screens of the fixed display 130, the movable display 140, and the second movable display 145 in the living room area. For example, the user may do yoga exercise in the living room area, and the movable display 140 and the second movable display 145 display actions of yoga teaching. Alternatively, the user may watch, in the living room area, movies played by the movable display 140 and the second movable display 145.

Figure 6:
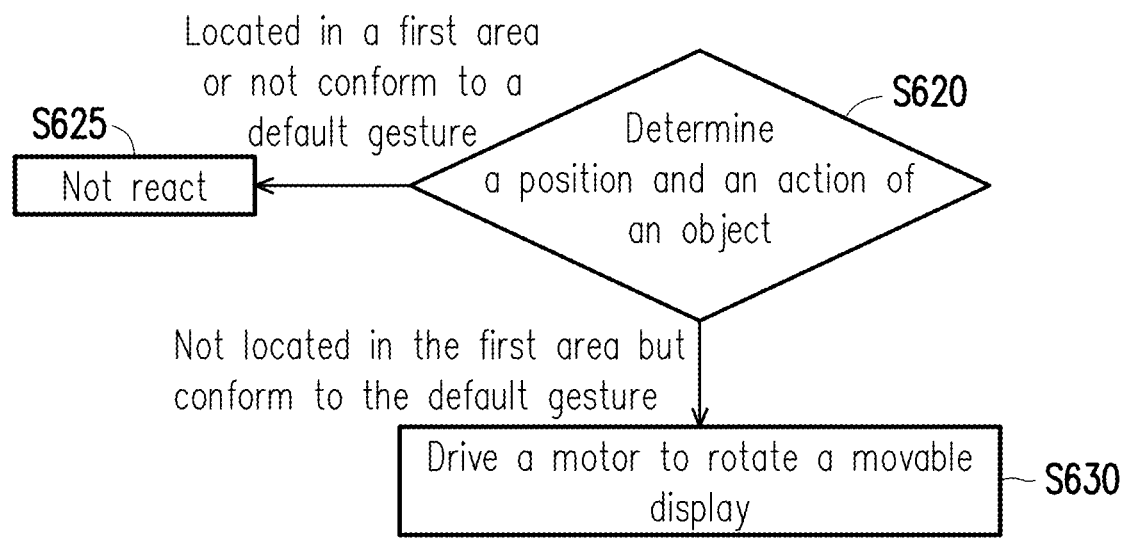
FIG. 6 is a flowchart of a control method of a movable display according to an embodiment of the present disclosure.

FIG. 6 is a flowchart of a control method of a movable display according to an embodiment of the present disclosure. Referring to FIG. 6, the control circuit 180 determines, according to a depth image obtained by the depth camera 163, a position of an external object in the depth image, and determines an action of the object (for example, waving of a hand, movement of a person, or swing of a head) through the action sensor 161 (step S620). In this embodiment, the action sensor 161 detects a gesture of a user, and generates a gesture command signal (for example, a particular gesture of motionlessness or motion) according to the gesture. Moreover, when the movable display 140 and the second movable display 145 are located at a coplanar turn-off position shown in FIG. 5, the control circuit 180 determines a position of the external object in the external image relative to the movable display 140 and/or the second movable display 145.

In this embodiment, the depth camera 163 detects a user position, and the control circuit 180 determines whether the detected user position falls within a motion range of the movable display 140. If the relative position of the external object is in a default area (for example, a motion range A shown in FIG. 7A or a motion range B shown in FIG. 7F), or a user action (corresponding to a gesture command signal) does not conform to a first preset gesture (for example, waving of a hand to the right, or waving of a hand from the left to the right or from the right to the left), the smart sanitary system 100 does not react (step S625) (for example, the movable display 140 or the second movable display 145 is not rotated), so that the movable display 140 or the second movable display 145 is not normally turned on in difficulty because of hindrance of the external object. However, if the position of the external object is not in the default area and an action thereof conforms to the first preset gesture (corresponding to a first rotation command signal), the control circuit 180 receives the first rotation command signal and drives the motor 150 according to the first rotation command signal, so that the corresponding movable display 140 or the second movable display 145 is turned on (rotated and turned on in this embodiment) (step S630).

It should be noted that, in another embodiment, a condition of triggering the movable display 140 and the second movable display 145 may be that motion of the external object conforms to preset motion of a particular position of a body.

Figure 7A:
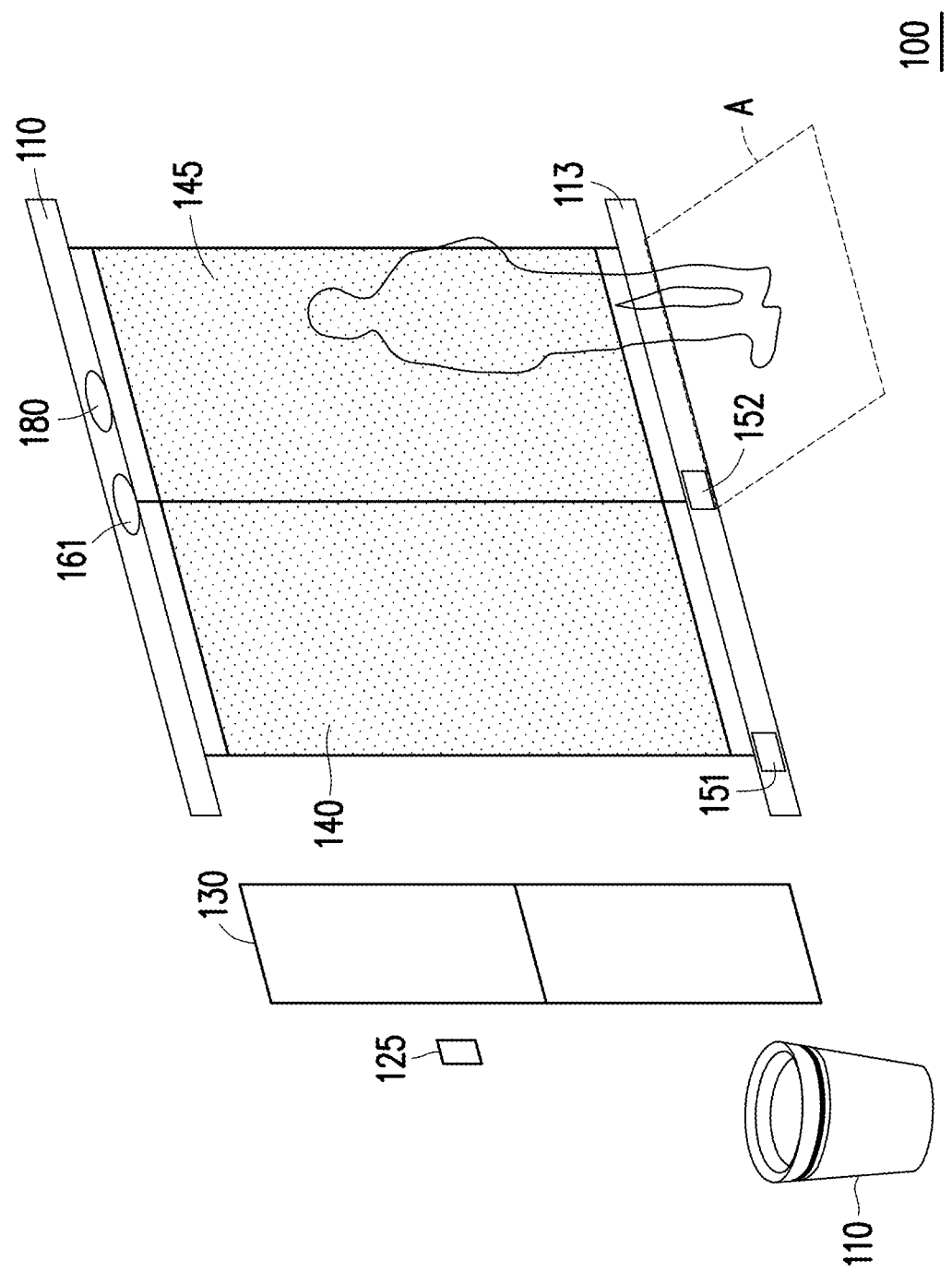
FIG. 7A to FIG. 7K are schematic diagrams of controlling a movable display according to an embodiment of the present disclosure.
Figure 7B:
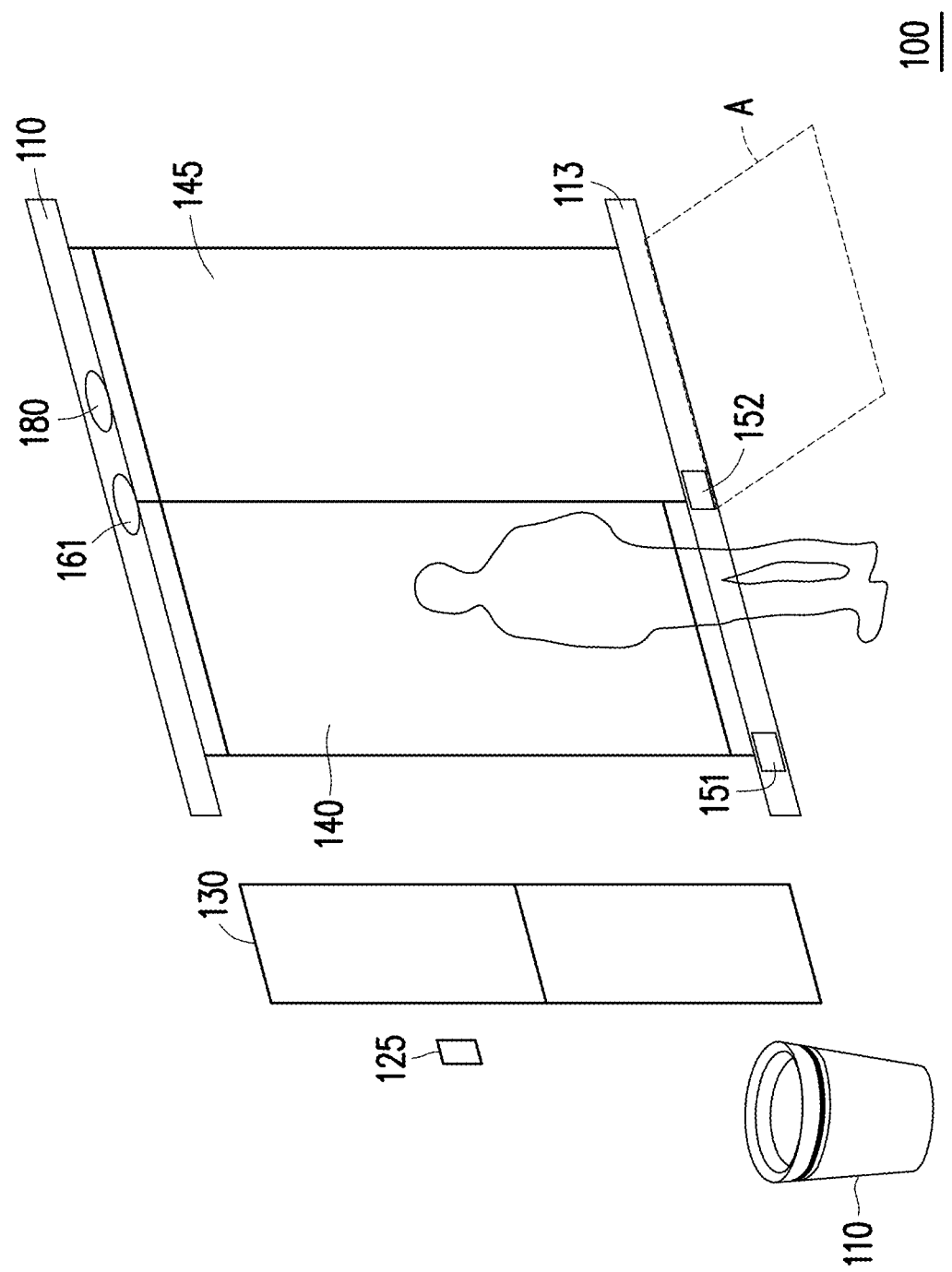

FIG. 7A to FIG. 7K are schematic diagrams of controlling a movable display according to an embodiment of the present disclosure. Referring to FIG. 7A, if the control circuit 180 determines that an action of an external object corresponds to the second movable display 145, it is determined whether a relative position of the external object falls within a motion range A (the width thereof is roughly equal to that of the second movable display 145) of the second movable display 145. As shown in the figure, the control circuit 180 may determine that a user falls within the motion range A of the second movable display 145, and therefore the second movable display 145 is maintained at an original position. Referring to FIG. 7B, the control circuit 180 determines that the user does not fall within the motion range A of the second movable display 145.

Figure 7C:
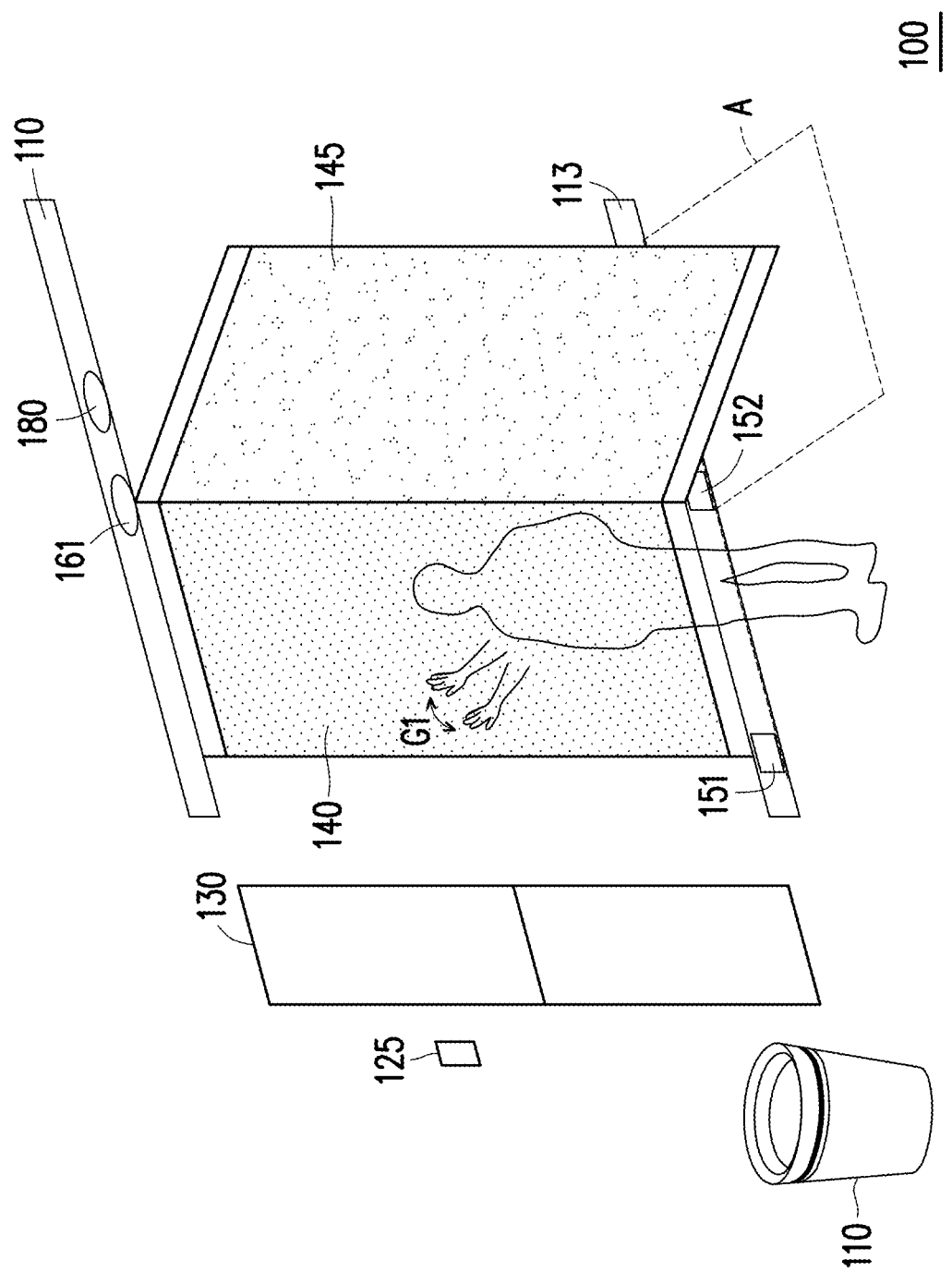

Referring to FIG. 7C, when the control circuit 180 further detects, according to an external image, that an operation of a gesture G1 of the user is, for example, waving from the right to the left (conforms to a preset gesture), the control circuit 180 drives a motor 152 to turn on the second movable display 145 in a clockwise direction, so that the second movable display 145 is rotated by 90 degrees (this angle may be changed according to a requirement) and then is perpendicular turned on to the movable display 140.

Figure 7D:
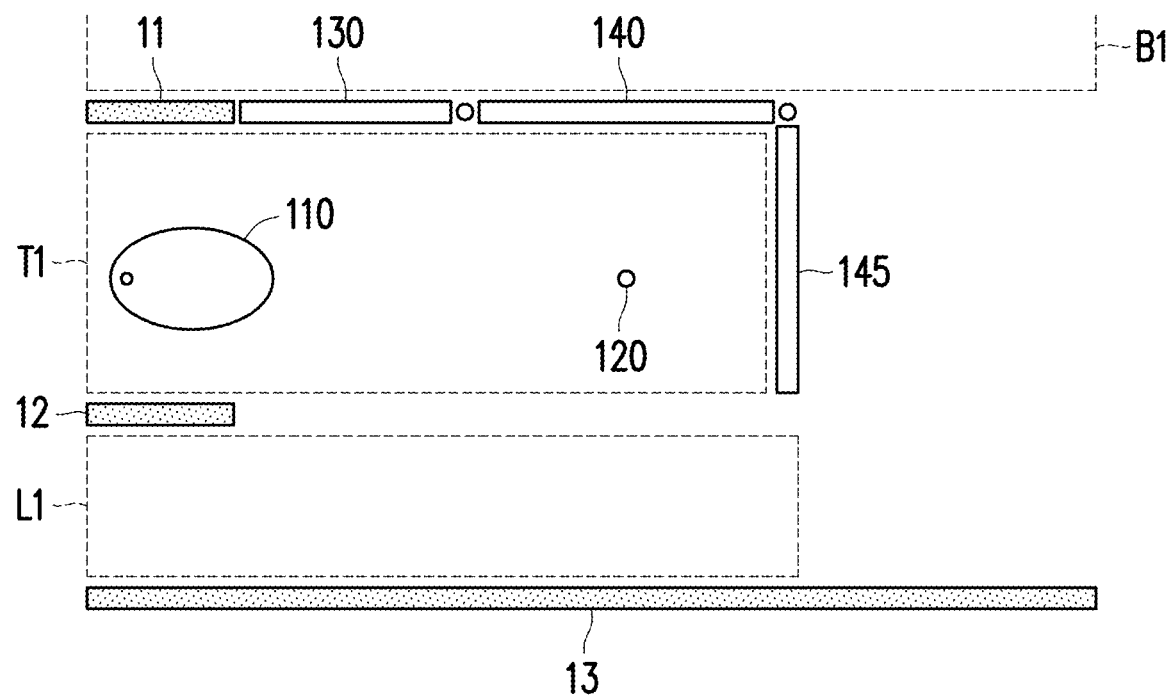
Figure 7E:
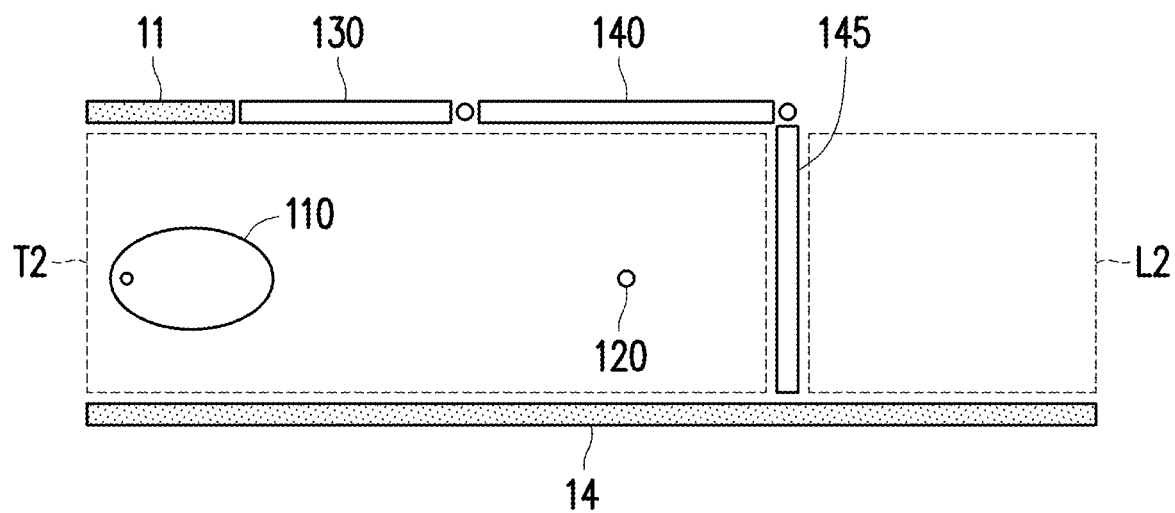

Referring to a space configuration in FIG. 7D, compared with FIG. 2A, a bathroom area T1 is separated from a living room area L1. Referring to a space configuration in FIG. 7E, compared with FIG. 2B, a larger bathroom area T2 may be formed. Accordingly, a private and splash proof shower space or toileting space may be constructed. Alternatively, a dressing or make-up space may be created.

Figure 7F:
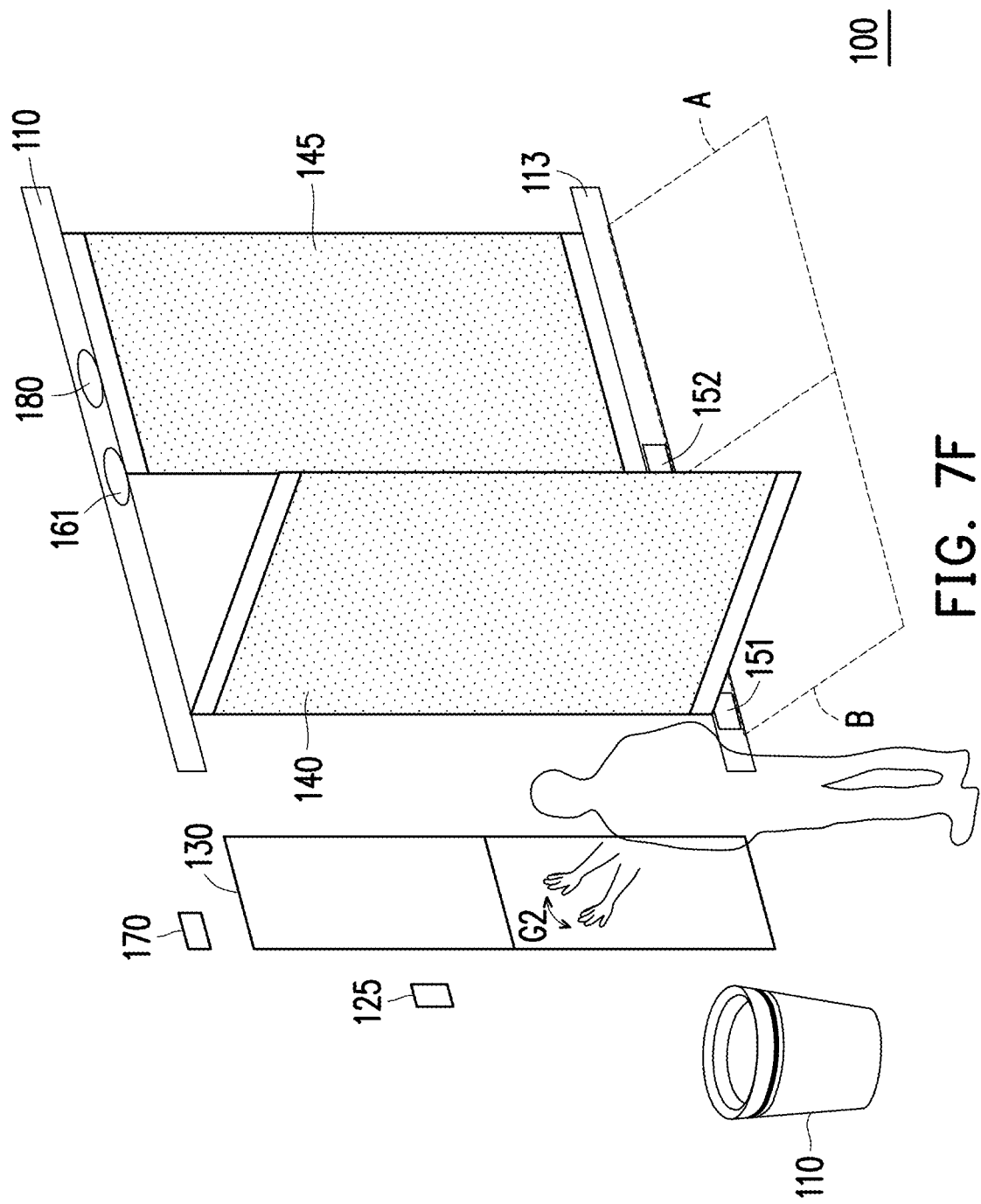

Referring to FIG. 7F, if the control circuit 180 determines that an action of an external object corresponds to the movable display 140, it is determined whether a relative position of the external object falls within a motion range B (the width thereof is roughly equal to that of the movable display 140) of the movable display 140. As shown in the figure, the control circuit 180 may determine that the user does not fall within the motion range B of the movable display 140. When the control circuit 180 further detects, according to an external image, that an operation of a gesture G2 of the user is, for example, waving twice from the right to the left (conforms to a preset gesture), the control circuit 180 drives a motor 151 to turn on the movable display 140 in a clockwise direction, so that the movable display 140 is rotated by 90 degrees (this angle may be changed according to a requirement) and then is perpendicular turned on to the fixed display 130.

Figure 7G:
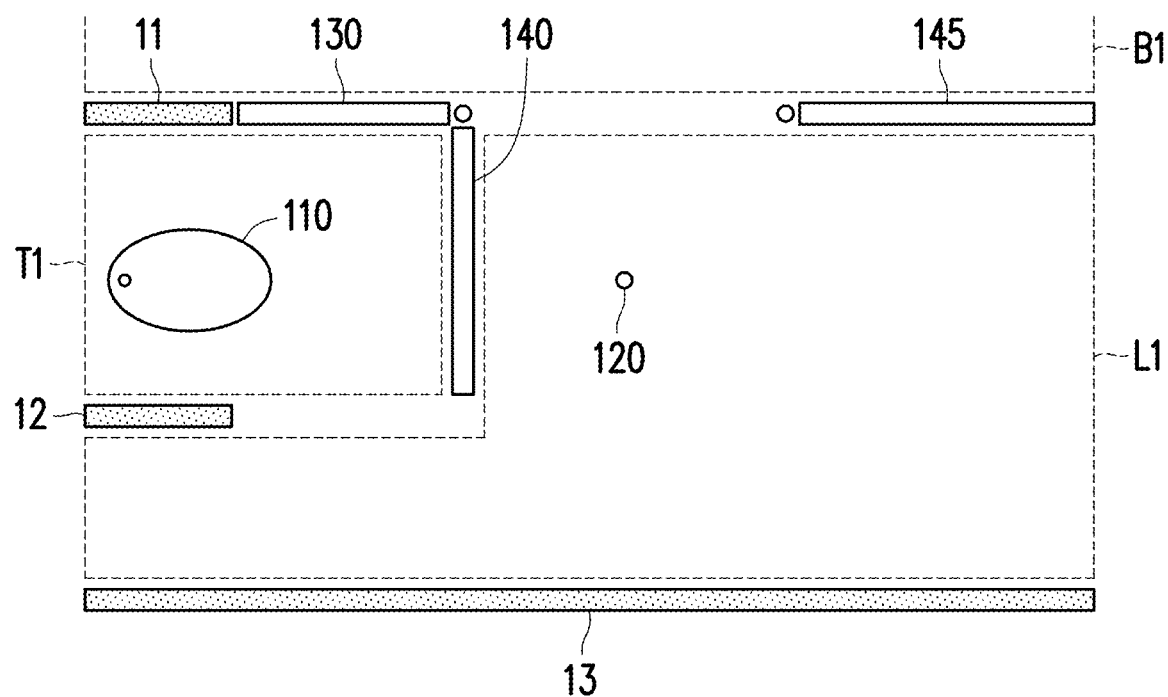
Figure 7H:
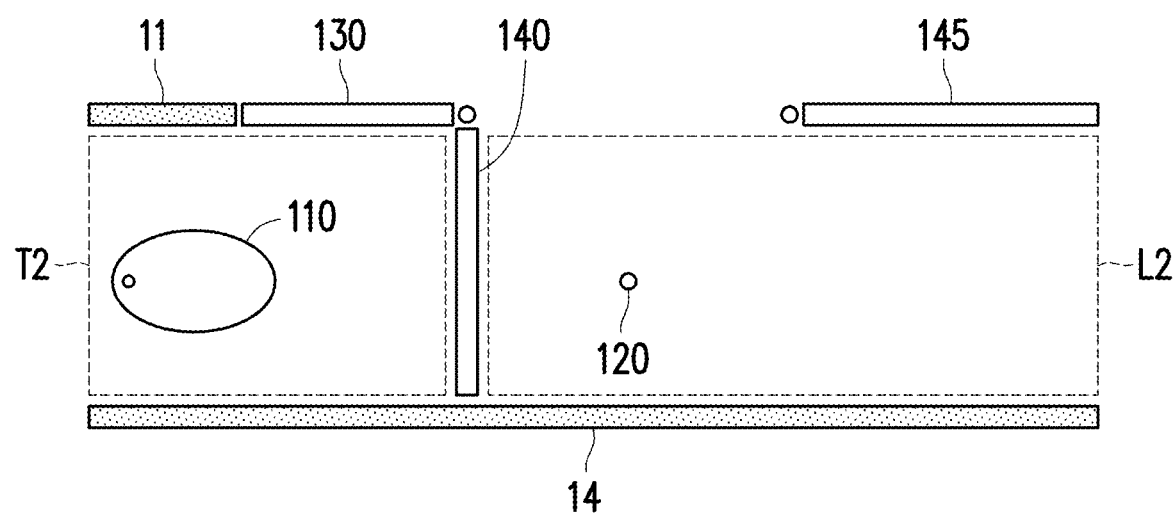

Referring to a space configuration in FIG. 7G, compared with FIG. 7D, a bathroom area T1 excludes a water supply area of the shower unit 120. Referring to a space configuration in FIG. 7H, compared with FIG. 7E, similarly, a bathroom area T2 is limited to an area in which the toilet unit 110 is located. Accordingly, a privately toileting space may be constructed. Alternatively, a make-up space may be created.

Figure 7I:
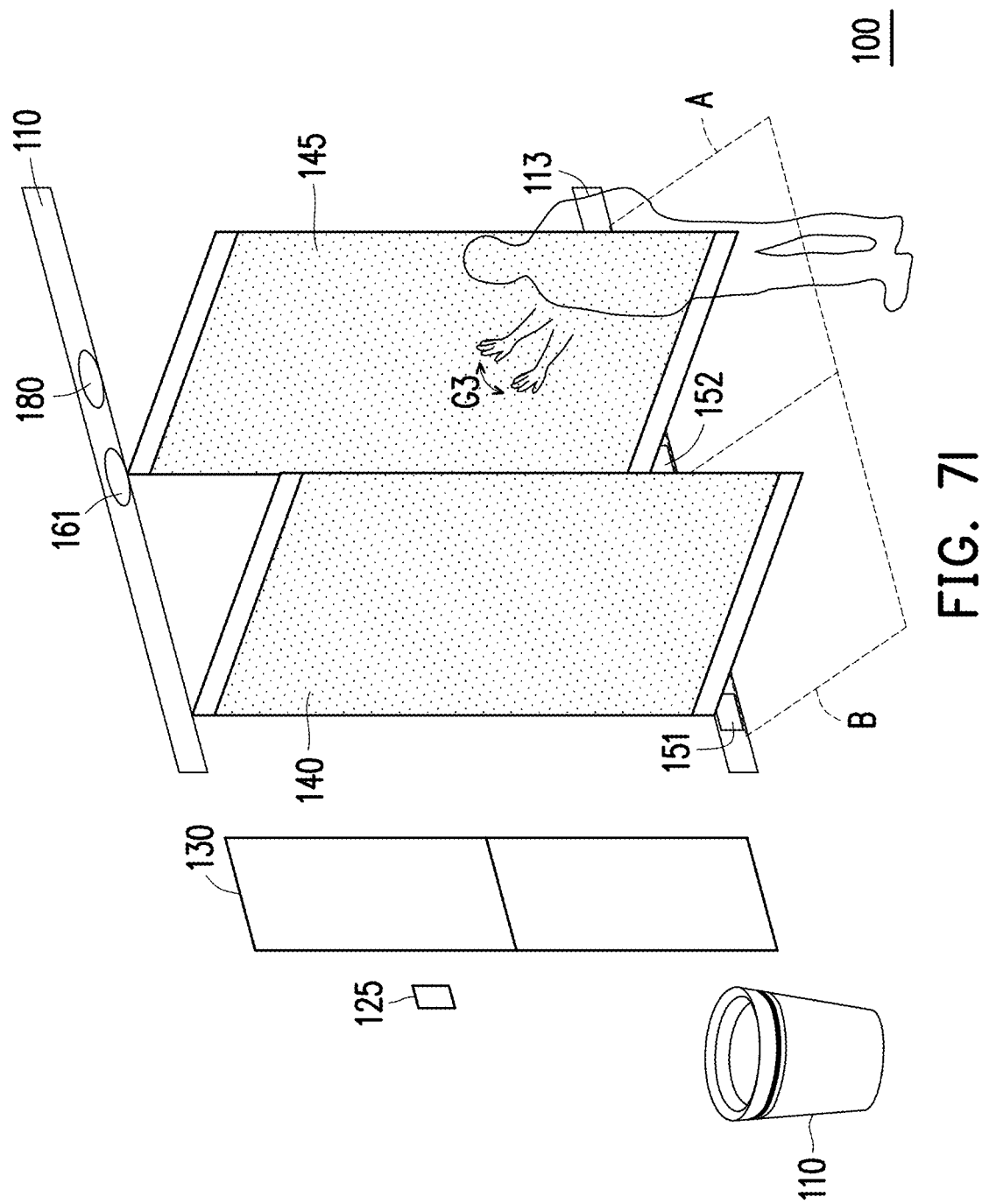

Referring to FIG. 7F, if the control circuit 180 determines that motion of an external object corresponds to the second movable display 145, it is determined whether a relative position of the external object falls within a motion range A of the second movable display 145. Referring to FIG. 7I, the control circuit 180 may determine that the user does not fall within the motion range A of the second movable display 145. When the control circuit 180 further detects, according to an external image, that an operation of a gesture G3 of the user is, for example, waving from the left to the right (conforms to a preset gesture), the control circuit 180 drives a motor 152 to turn on the movable display 140 in a clockwise direction, so that the second movable display 145 is rotated by 90 degrees (this angle may be changed according to a requirement) and then is parallel turned on to the movable display 140.

Figure 7J:
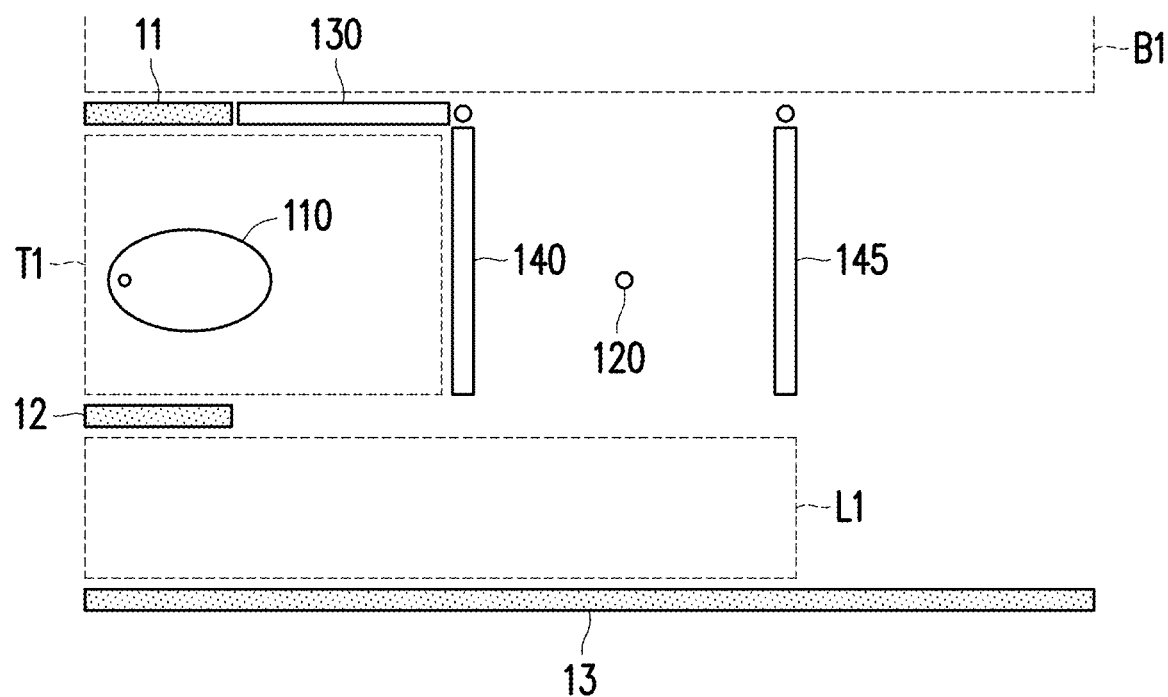
Figure 7K:
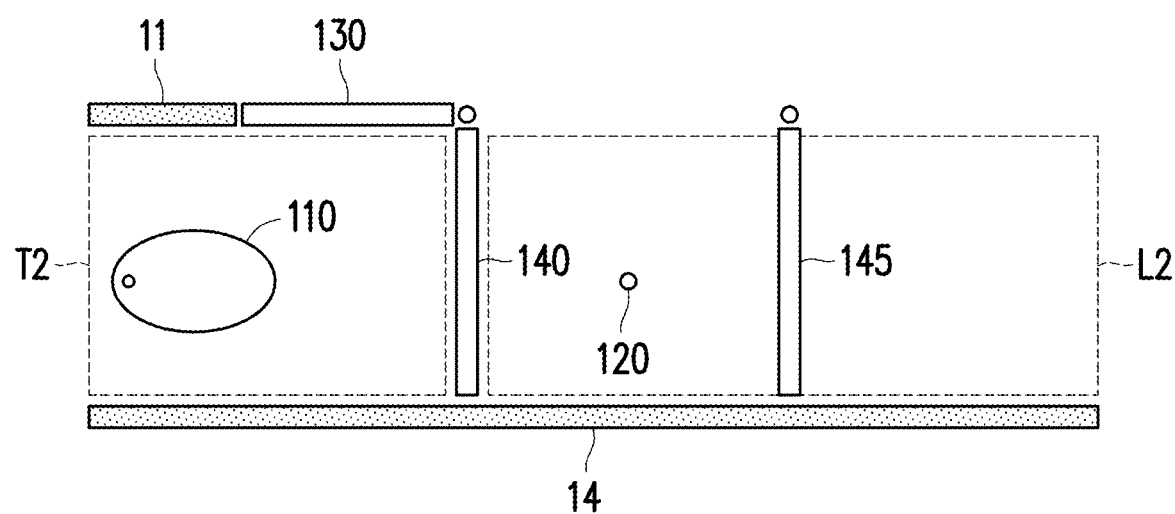

Referring to a space configuration in FIG. 7J, compared with FIG. 7G, one more passage makes a bedroom area B1 and a living room area L1 in communication with each other. Referring to a space configuration in FIG. 7K, compared with FIG. 7H, three compartments may be formed. Accordingly, it can be known that, turn-on or turn-off of a movable display 140 in combination with another movable display 140 may create more space variations.

It should be noted that, in the foregoing embodiment, the corresponding movable display 140 or the second movable display 145 is turned on by detecting the gesture command signal. In another embodiment, the user instruction is a wireless command signal, the wireless communications receiver 165 receives this wireless command signal, and the control circuit 180 may determine to control motion of the movable display 140 and/or the second movable display 145 according to the wireless command signal. For example, the user sends, through a mobile apparatus, the wireless command signal for rotating the movable display 140, and therefore the control circuit 180 may control rotation of the movable display 140 through the motor 151.

In still another embodiment, the user instruction is a voice instruction, the voice receiving apparatus 167 receives this voice instruction, and the control circuit 180 may determine to control motion of the movable display 140 and/or the second movable display 145 according to the voice instruction. For example, the voice instruction is opening a right door, and therefore the control circuit 180 compares the voice instruction with a default voice instruction (for example, opening, rotating by 90 degrees, or closing). If the voice instruction conforms to the default voice instruction, the control circuit 180 may control rotation of the second movable display 145 through the motor 152.

In yet another embodiment, the depth camera 163 detects a user position, and the control circuit 180 may control motion of the movable display 140 and/or the second movable display 145 according to the user position. Taking FIG. 7F as an example, if the control circuit 180 recognizes that the user is in front of the fixed display 130, the movable display 140 is rotated and turned on through the motor 151. Moreover, before the user leaves from the fixed display 130, the motor 151 again rotates and turns off the movable display 140.

Returning to FIG. 4, the control circuit 180 controls an operation of at least one of the shower unit 120 or the toilet unit 110 according to a position of the movable display 140 (step S430). Specifically, it can be known from FIG. 7D, FIG. 7E, FIG. 7G and FIG. 7H that, the smart sanitary system 100 may form toileting areas T1 and T2. In this embodiment of the present disclosure, motion of the movable display 140 triggers an operation of the shower unit 120 or the toilet unit 110.

In an embodiment, the user instruction is directed to the toilet unit 110. When the movable display 140 leaves from a position on which the movable display 140 is coplanar with the fixed display 130, the control circuit 180 controls the cover 113 of the toilet unit 110 to be opened. For example, the movable display 140 is turned on coplanar with the fixed display 130 as shown in FIG. 5, and assuming that the gesture command signal conforms to a second default gesture, the second movable display 145 is clockwise rotated. In this case, as the second movable display 145 leaves from the position shown in FIG. 5, the motor 150 may control the cover 113 to be rotated and opened synchronously or after a small period of time (for example, 100 milliseconds or 500 milliseconds), so that the opening of the body 111 of the toilet unit 110 is exposed. It should be noted that, the user instruction being a wireless command signal or a voice instruction may also trigger a coupling operation between the movable display 140 and the cover 113.

In another embodiment, after the fixed display 130 is perpendicular turned on to the movable display 140 or the second movable display 145, the control circuit 180 recognizes a next user instruction detected by the user instruction sensor 160, and determines whether this user instruction is related to the toilet unit 110.

Figure 8:
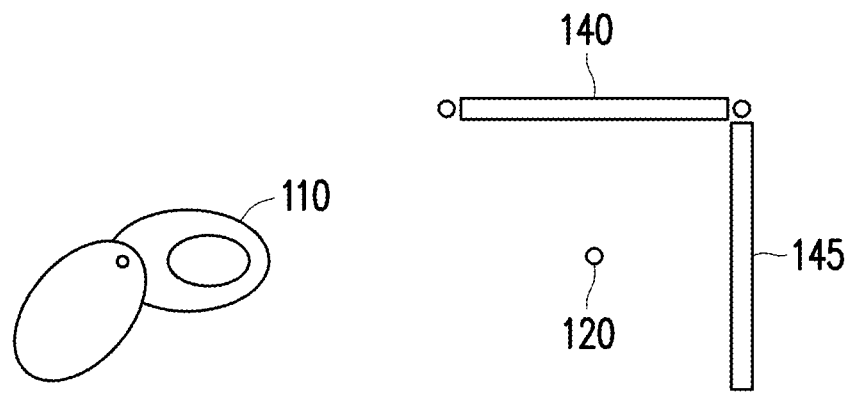
FIG. 8 is a space configuration diagram of a smart sanitary system according to an embodiment of the present disclosure.

For example, FIG. 8 is a space configuration diagram of a smart sanitary system 100 according to an embodiment of the present disclosure. Referring to FIG. 8, description is made below by using a toileting area as an example that is formed after the second movable display 145 is perpendicular turned on to the movable display 140, and an operation thereof is likewise applicable to turn-on situations in FIG. 7I to FIG. 7K.

Figure 9:
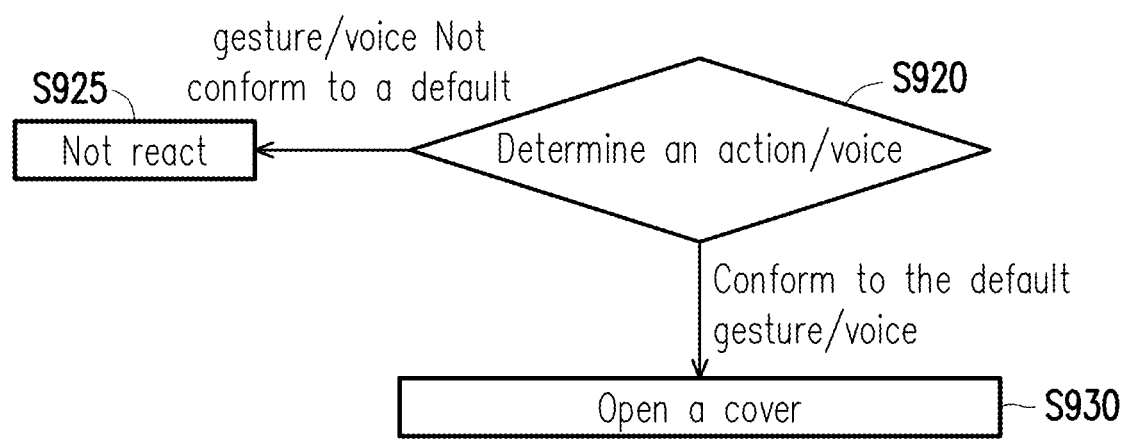
FIG. 9 is a flowchart of a control method of a toilet unit according to an embodiment of the present disclosure.

FIG. 9 is a flowchart of a control method of a toilet unit 110 according to an embodiment of the present disclosure. Referring to FIG. 9, after the movable display 140 or the second movable display 145 is perpendicular turned on to the fixed display 130, the control circuit 180 determines an action of the external object (for example, waving of a hand, movement of a person, or swing of a head) detected by the action sensor 161, or determines a voice instruction received by the voice receiving apparatus 167 (step S920). In this embodiment, the action sensor 161 detects a gesture of the user, and generates a gesture command signal according to the gesture.

If an action (corresponding to the gesture command signal) of the external object does not conform to a second preset gesture (for example, upward waving of a hand, or vertical waving of a hand), the smart sanitary system 100 does not react (step S925) (for example, the cover 113 performs no action). If an action of the external object conforms to the second preset gesture (corresponding to a second rotation command signal), or if the voice instruction conforms to a default voice instruction (for example, turn-on, opening, or rotation), the control circuit 180 receives the voice instruction and drives the motor 150 according to the second rotation command signal or the default voice instruction, so that the cover 113 is opened (step S930). It should be noted that, in another embodiment, a condition of triggering the cover 113 may be that motion of the external object conforms to particular motion of a particular position of a body.

Figure 10:
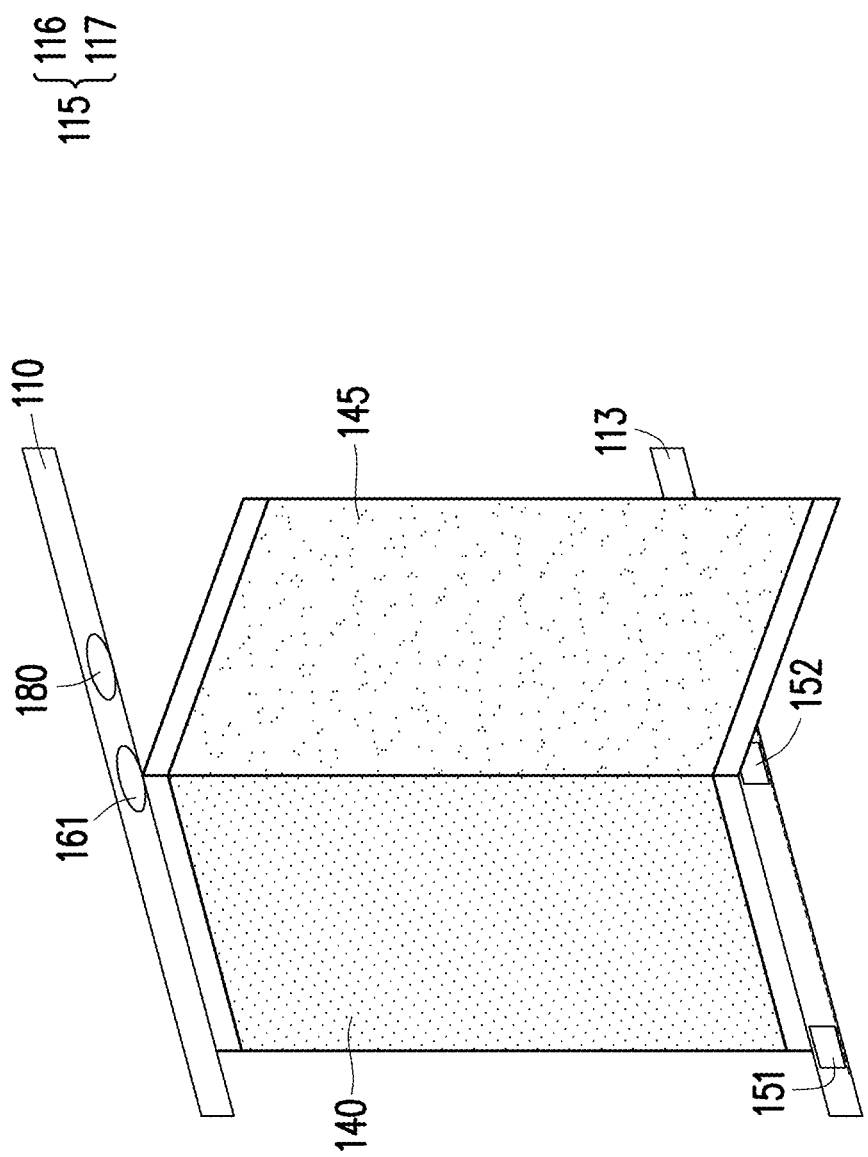
FIG. 10 is a schematic diagram of controlling a toilet unit according to an embodiment of the present disclosure.
Figure 10:
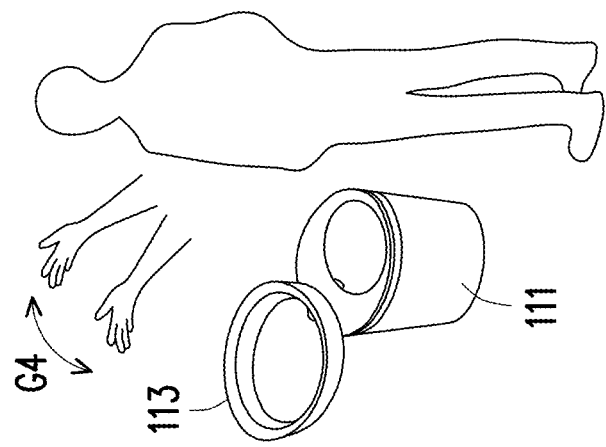

FIG. 10 is a schematic diagram of controlling a toilet unit 110 according to an embodiment of the present disclosure. Referring to FIG. 10, when a control circuit 180 further detects, according to an external image, that an operation of a gesture G4 of a user is, for example, waving from the bottom to the top (conforms to a preset gesture), the control circuit 180 drives a motor 150 to rotate and open a cover 113 in a clockwise direction, so that the cover 113 is rotated by 90 degrees (this angle may be changed according to a requirement) to expose an opening of the body 111. The user may begin using toilet.

It should be noted that, an operation about closing the cover 113 may also be driven through the foregoing user instruction. Details are not described herein again.

According to another aspect, to change a toileting atmosphere of the user, this embodiment of the present disclosure can further improve user experience in combination with an image, a video, a piece of music or an audio, or an odor. An operation occasion of the auxiliary apparatus 115 or the movable display 140 is related to the cover 113. In an embodiment, in response to detecting that the user is sitting on the toilet unit 1 or the cover 113 is opened, the control circuit 180 starts an operation (for example, power-on, power-off, or operation frequency adjustment) of the auxiliary apparatus 115.

Figure 11:
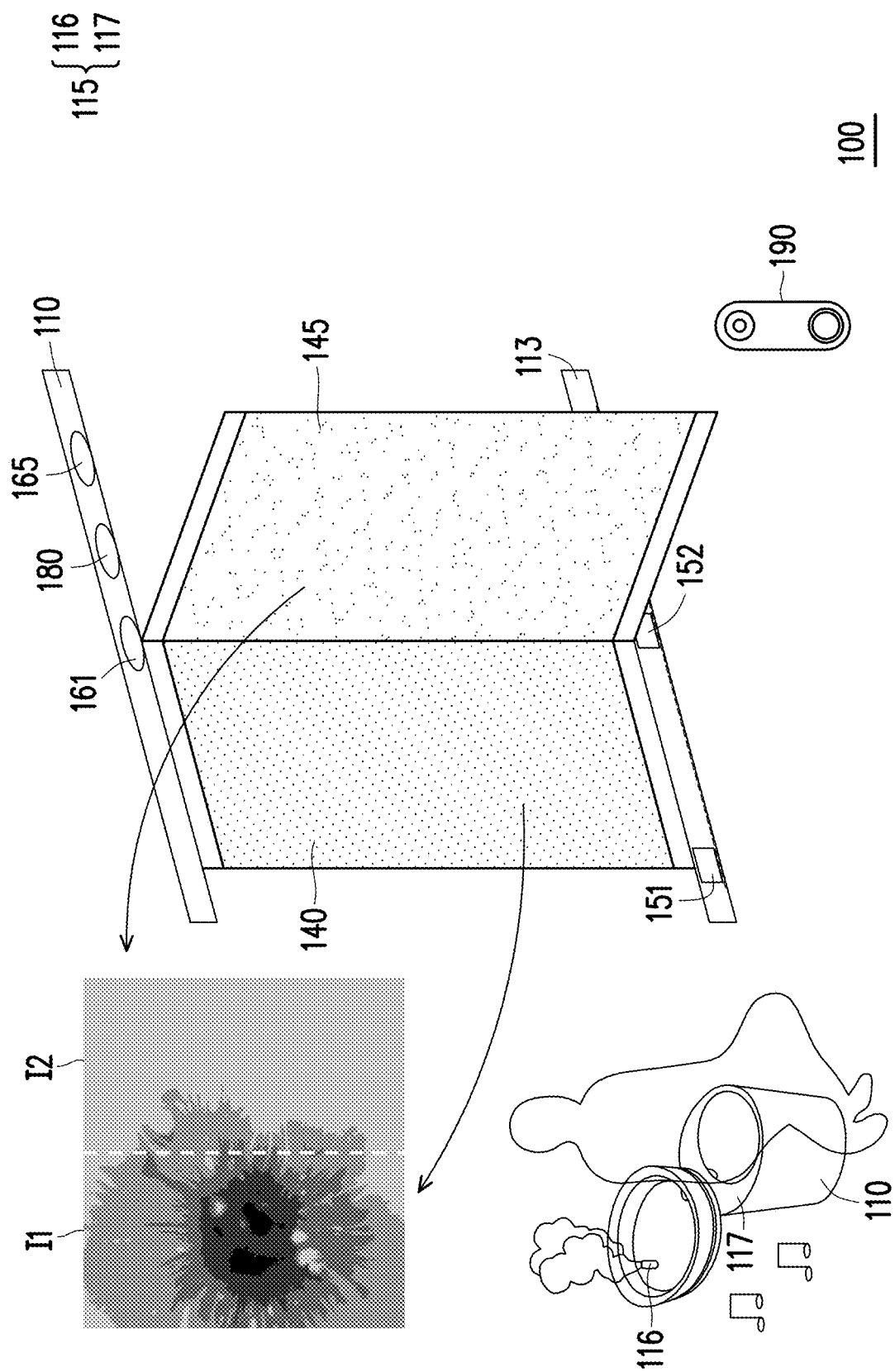
FIG. 11 is a schematic diagram of controlling a toilet unit according to an embodiment of the present disclosure.

For example, FIG. 11 is a schematic diagram of controlling a toilet unit according to an embodiment of the present disclosure. Referring to FIG. 11, a control circuit 180 controls a flavor releaser 116 to spray a fragrance or a deodorant once or intermittently. In this case, the control circuit 180 can further display, on a fixed display 130 and/or a movable display 140, an image or a video related to the fragrance or the deodorant sprayed by the flavor releaser 116. For example, this image or video is an image, a photo or a video of flowers added at the time of spraying the fragrance or the deodorant. As shown in the figure, spliced screens I1 and I2 of the movable display 140 and the second movable display 145 are photos related to the flowers.

For another example, the control circuit 180 controls a loudspeaker 117 to continuously play one or more disgrace concealment music or an audios (for example, music or an audios with a lively rhythm or sounds in nature environment). The disgrace concealment music or audios is used to cover the sounds during defecate or pee, and prevent these sounds are heard by user or other people. In this case, the control circuit 180 can further display an image or a video related to the currently played disgrace concealment music or an audio on the fixed display 130 and/or the movable display 140. For example, this video is a music video (MV) or a photo or movie conforming to a situation thereof.

To improve convenience, the displayed screen of the fixed display 130 and/or the movable display 140 can be further combined with another application. In an embodiment, after a visitor presses a button of a wireless bell 190, the wireless bell 190 may photograph an external object, so as to obtain an object image of this object, and send a guest signal including this object image to the outside. After the wireless communications receiver 165 receives this guest signal, the control circuit 180 may display the object image on the fixed display 130 or the movable display 140. Accordingly, the user may view the visitor in toileting areas T1 and T2.

Moreover, an image capture device 170 may be disposed near the fixed display 130, and is configured to photograph the face, the upper part of the body or the whole body of the user standing in front of the fixed display 130. The fixed display 130 or the movable display 140 may display a user image captured by the image capture device 170, and the control circuit 180 may further give a make-up suggestion or an outfit suggestion with reference to the user image.

According to another aspect, in an embodiment, the user instruction is directed to the shower unit 120. After the fixed display 130 is perpendicular turned on to the movable display 140, the control circuit 180 controls water supply of the shower unit 120 through the electrically controlled water valve 125. For example, the movable display 140 is turned on coplanar with the fixed display 130 as shown in FIG. 5, and assuming that the gesture command signal conforms to a third default gesture, the movable display 140 or the second movable display 145 is clockwise rotated. After the movable display 140 or the second movable display 145 is perpendicular turned on to the fixed display 130 as shown in FIG. 7C or FIG. 7F, the electrically controlled water valve 125 may control the shower unit 120 to begin water supply. It should be noted that, the user instruction being a wireless command signal or a voice instruction may also trigger a coupling operation between the movable display 140 and the shower unit 120.

In another embodiment, after the fixed display 130 is perpendicular turned on to the second movable display 145 (as shown in FIG. 7C), the control circuit 180 recognizes a next user instruction detected by the user instruction sensor 160, and determines whether this user instruction is related to the shower unit 120.

Figure 12:
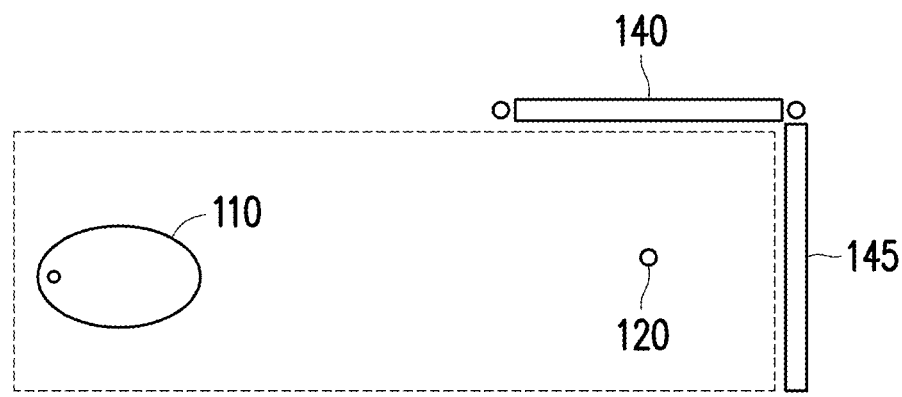
FIG. 12 is a space configuration diagram of a smart sanitary system according to an embodiment of the present disclosure.

For example, FIG. 12 is a space configuration diagram of a smart sanitary system 100 according to an embodiment of the present disclosure. Referring to FIG. 12, description is made below by using a toileting area as an example that is formed after the second movable display 145 is perpendicular turned on to the movable display 140, and an operation thereof is likewise applicable to turn-on situations in FIG. 7I to FIG. 7K.

Figure 13:
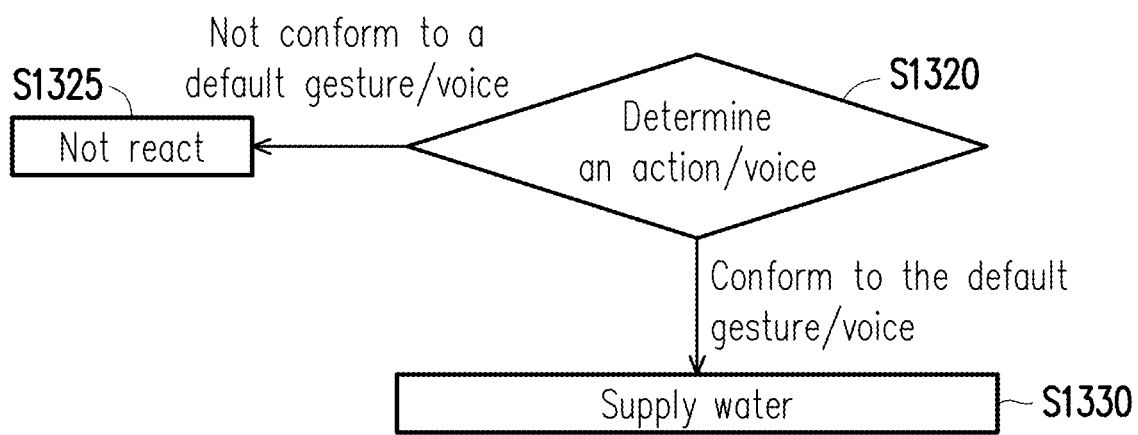
FIG. 13 is a flowchart of a control method of a shower unit according to an embodiment of the present disclosure.

FIG. 13 is a flowchart of a control method of a shower unit 120 according to an embodiment of the present disclosure. Referring to FIG. 13, after a movable display 140 or a second movable display 145 is perpendicular turned on to a fixed display 130, a control circuit 180 determines an action of an object (for example, waving of a hand, movement of a person, or swing of a head) detected by an action sensor 161, or determines a voice instruction received by a voice receiving apparatus 167 (step S1320). In this embodiment, the action sensor 161 detects a gesture of the user, and generates a gesture command signal according to the gesture.

If an action (corresponding to the gesture command signal) of the external object does not conform to a fourth preset gesture (for example, downward waving of a hand, or vertical waving of a hand), the smart sanitary system 100 does not react (step S1325) (for example, the shower unit 120 supplies no water). If an action of the external object conforms to the fourth preset gesture (corresponding to a water supply command signal), or if the voice instruction conforms to a default voice instruction (for example, taking a shower or turning on a water tap), the control circuit 180 receives the voice instruction and drives the electrically controlled water valve 125 according to the water supply command signal or the default voice instruction, so that the shower unit 120 supplies water (step S1330). It should be noted that, in another embodiment, a condition of triggering the shower unit 120 may be that motion of the external object conforms to particular motion of a particular position of a body.

Figure 14A:
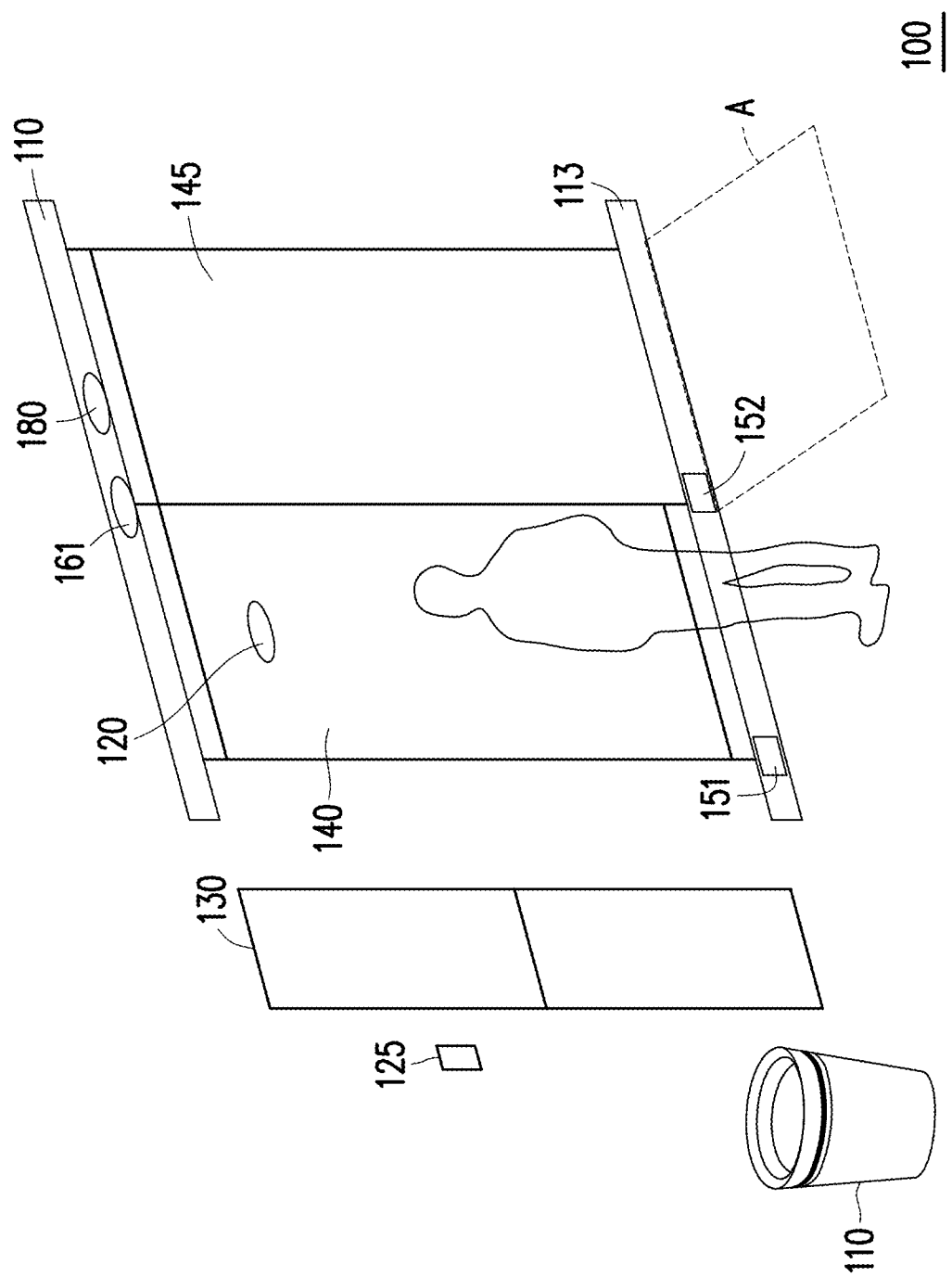
FIG. 14A to FIG. 14C are schematic diagrams of controlling a movable display or a shower unit according to an embodiment of the present disclosure.
Figure 14B:
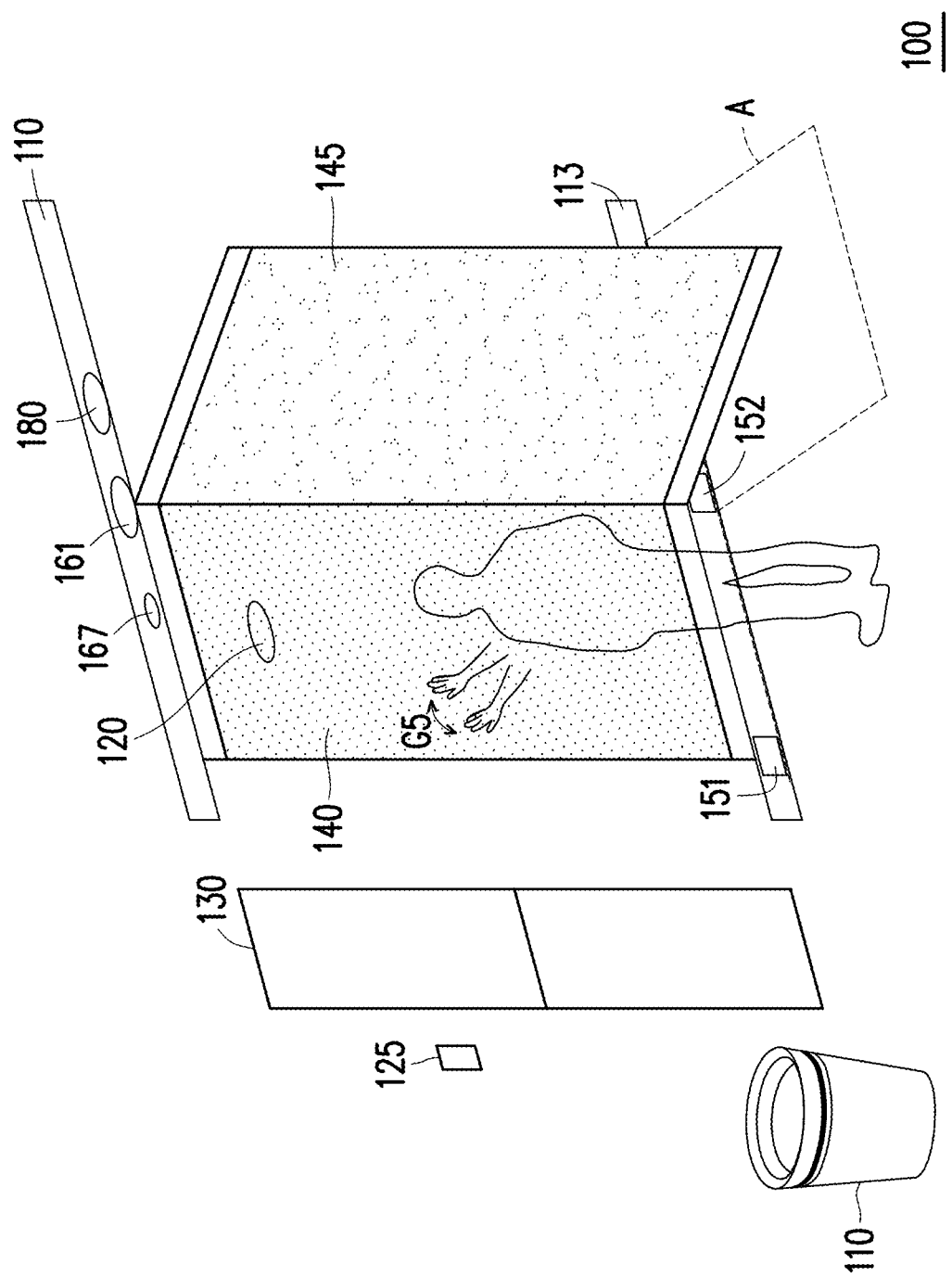
Figure 14C:
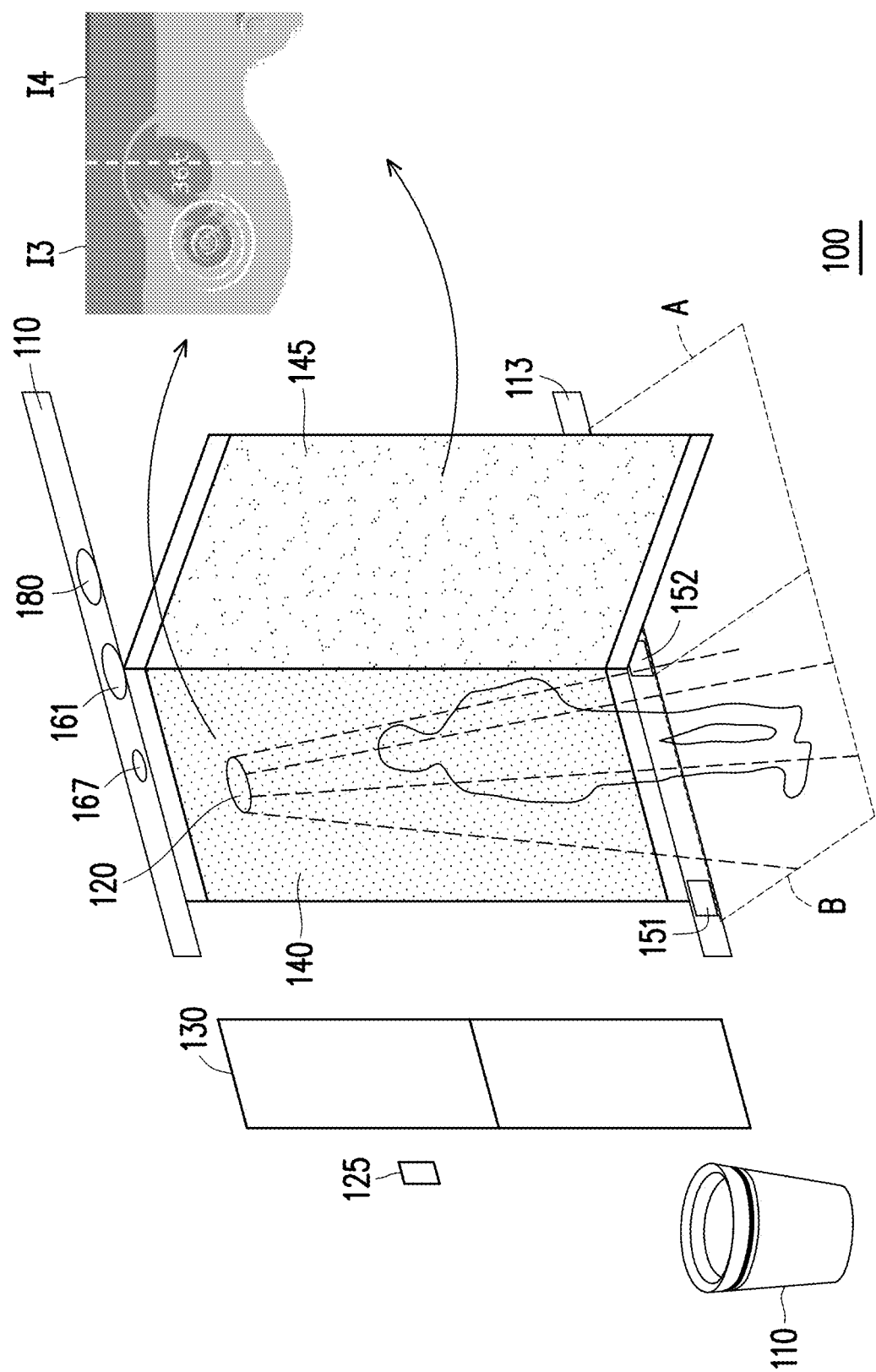

For example, FIG. 14A to FIG. 14C are schematic diagrams of controlling a movable display 140 or a shower unit 120 according to an embodiment of the present disclosure. Referring to FIG. 14A and FIG. 14B, for description of FIG. 14A and FIG. 14B, refer to content of FIG. 7B and FIG. 7C. Details are not described herein again. A gesture G5 may be the same as or different from the gesture G1, and may be autonomously changed in dependence on a requirement of a user.

Referring to FIG. 14C, the control circuit 180 determines whether a voice instruction detected by the voice receiving apparatus 167 conforms to a default voice instruction (for example, taking a shower, heating, or cooling). The control circuit 180 controls, through the electrically controlled water valve 125 according to the voice instruction conforming to the default voice instruction, the shower unit 120 to supply water, increase the water temperature or reduce the water temperature. Moreover, the control circuit 180 can further display shower or water supply related information on the fixed display 130 and/or the movable display 140. For example, as shown in the figure, spliced screens 13 and 14 of the movable display 140 and the second movable display 145 are foam or water wave images related to flowers, and may provide water temperature information detected by the electrically controlled water valve 125.

To sum up, based on the smart sanitary system and the control method thereof according to the embodiments of the present disclosure, the movable display is turned on or turned off to form different spaces, and drive an operation of the toilet unit or the shower unit. Moreover, in combination with an image or a video on the display, the user may enjoy different visual experiences in the different spaces.

Although the present disclosure is disclosed with reference to embodiments above, the embodiments are not intended to limit the present disclosure. Any person of ordinary skill in the art may make some variations and modifications without departing from the spirit and scope of the disclosure, and therefore, the protection scope of the present disclosure should be defined in the following claims.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A control method of a smart sanitary system, comprising:
   providing a movable display, a shower unit and a toilet unit;
   controlling motion of the movable display; and
   controlling an operation of at least one of the shower unit or the toilet unit according to a position of the movable display, comprising:
      controlling, by a control circuit, in response to that a user instruction is directed to using the toilet unit, a cover of the toilet unit to open and the movable display is rotated in a clockwise direction or in a counter-clockwise direction by 90 degrees, through a motor, to a position where the movable display is perpendicular to a first reference plane and a second reference plane, wherein the first reference plane is parallel with the second reference plane, the first reference plane is located at one side of the toilet unit, and the second reference plane is located at another side of the toilet unit and controlling, by the motor, the cover of the toilet unit to be opened and the movable display to leave from a position where the movable display is coplanar with the first reference plane.

2. A control method of a smart sanitary system, comprising:
   providing a movable display, a shower unit and a toilet unit;
   controlling motion of the movable display; and
   controlling an operation of at least one of the shower unit or the toilet unit according to a position of the movable display, comprising:
      controlling, by a control circuit, in response to that a user instruction is directed to using the shower unit, the shower unit to supply water and the movable display is rotated in a clockwise direction or in a counter-clockwise direction by 90 degrees, through a motor, to a position where the movable display is perpendicular to a first reference plane and a second reference plane, wherein the first reference plane is parallel with the second reference plane, the first reference plane is located at one side of the toilet unit, and the second reference plane is located at another side of the toilet unit;
      controlling, by the control circuit, in response to that a user instruction is directed to using the toilet unit, a cover of the toilet unit to open when the movable display is perpendicular to the first reference plane and the second reference plan; and
      controlling, by the motor, the cover of the toilet unit to be opened and the movable display to leave from a position where the movable display is coplanar with the first reference plane.

3. A control method of a smart sanitary system, comprising:
   providing a fixed display, a movable display, a shower unit and a toilet unit;
   controlling motion of the movable display relative to the fixed display; and
   controlling an operation of at least one of the shower unit or the toilet unit according to a position of the movable display, comprising:
   in response to the movable display rotating in a clockwise direction or in a counter-clockwise direction by 90 degrees, through a motor, from
   a first position where the movable display is coplanar with the fixed display and is parallel with an external wall to
   a second position where the movable display is perpendicular to the fixed display and the external wall and the movable display is located in front of the toilet unit;
   triggering, by a control circuit, the operation of at least one of the shower unit or the toilet unit, wherein the fixed display is parallel with the external wall, the shower is disposed between the fixed display and the external wall, and the toilet unit is disposed between the fixed display and the external wall; and
   controlling, by the motor, a cover of the toilet unit to open and the movable display to leave from the first position.

4. The control method of a smart sanitary system according to claim 3, wherein the step of controlling motion of the movable display relative to the fixed display comprises:
   detecting a user position; and
   controlling motion of the movable display according to the user position.

5. The control method of a smart sanitary system according to claim 3, wherein the step of controlling motion of the movable display relative to the fixed display comprises:
   receiving a user instruction; and
   controlling motion of the movable display according to the user instruction.

6. The control method of a smart sanitary system according to claim 5, wherein the step of controlling the operation of at least one of the shower unit or the toilet unit according to the position of the movable display comprises:
   controlling, in response to that the user instruction is directed to using the shower unit, the shower unit to supply water when the movable display is perpendicular to the fixed display.

7. The control method of a smart sanitary system according to claim 6, wherein the step of controlling the shower unit to provide water comprises:

displaying shower or water supply related information through at least one of the fixed display or the movable display.

8. The control method of a smart sanitary system according to claim 5, wherein the step of controlling motion of the movable display relative to the fixed display comprises:
   detecting a user position; and
   determining whether the user position falls within a motion range of the movable display.

9. The control method of a smart sanitary system according to claim 8, wherein after the step of determining whether the user position falls within a motion range of the movable display, the control method further comprises:
   controlling, if the user position does not fall within the motion range of the movable display, motion of the movable display according to the user instruction after the user instruction is received.

10. The control method of a smart sanitary system according to claim 5, wherein the step of controlling the operation of at least one of the shower unit or the toilet unit according to the position of the movable display comprises:
    controlling, in response to that the user instruction is directed to using the toilet unit, the cover of the toilet unit to open when the movable display is perpendicular to the fixed display.

11. The control method of a smart sanitary system according to claim 10, wherein after the step of opening a cover of the toilet unit, the control method further comprises:
    spraying a fragrance or a deodorant once or intermittently; and
    displaying an image or a video related to the fragrance or deodorant through at least one of the fixed display or the movable display.

12. The control method of a smart sanitary system according to claim 10, wherein after the step of opening a cover of the toilet unit, the control method further comprises:
    continuously playing at least one disgrace concealment music or an audio; and
    displaying an image or a video related to the at least one disgrace concealment music or an audio through at least one of the fixed display or the movable display.

13. The control method of a smart sanitary system according to claim 10, wherein after the step of opening the cover of the toilet unit, the control method further comprises:
    photographing an external object, to obtain an object image of the external object;
    receiving a guest signal, wherein the guest signal comprises the object image; and
    displaying the object image through at least one of the fixed display or the movable display.

* * * * *